(12) United States Patent
Nietfeld et al.

(10) Patent No.: US 10,987,573 B2
(45) Date of Patent: Apr. 27, 2021

(54) VIRTUAL REALITY HAND GESTURE GENERATION

(71) Applicant: Valve Corporation, Bellevue, WA (US)

(72) Inventors: Scott Douglas Nietfeld, Bellevue, WA (US); Joe van den Heuvel, Redmond, WA (US)

(73) Assignee: Valve Corporation, Bellevue, WA (US)

( * ) Notice: Subject to any disclaimer, the term of this patent is extended or adjusted under 35 U.S.C. 154(b) by 155 days.

(21) Appl. No.: 16/195,718

(22) Filed: Nov. 19, 2018

(65) Prior Publication Data

US 2019/0138107 A1 May 9, 2019

Related U.S. Application Data

(63) Continuation-in-part of application No. 15/834,372, filed on Dec. 7, 2017, now Pat. No. 10,307,669, (Continued)

(51) Int. Cl.
| | |
|---|---|
| *A63F 13/213* | (2014.01) |
| *G06F 3/01* | (2006.01) |
| *G06T 19/00* | (2011.01) |
| *A63F 13/218* | (2014.01) |
| *A63F 13/24* | (2014.01) |

(Continued)

(52) U.S. Cl.
CPC .......... *A63F 13/213* (2014.09); *A63F 13/218* (2014.09); *A63F 13/24* (2014.09); *A63F 13/428* (2014.09); *A63F 13/67* (2014.09); *G06F 3/011* (2013.01); *G06F 3/017* (2013.01); *G06F 3/038* (2013.01); *G06F 3/0325* (2013.01);
(Continued)

(58) Field of Classification Search
CPC ........ A63F 13/22; A63F 13/67; A63F 13/218; A63F 13/24; A63F 13/428; A63F 13/213; G06F 3/017; G06F 3/038; G06F 3/0325; G06F 3/03547; G06F 3/0346; G06F 3/011; G06T 19/006
See application file for complete search history.

(56) References Cited

U.S. PATENT DOCUMENTS

| | | |
|---|---|---|
| 4,489,302 A | 12/1984 | Eventoff |
| 4,845,457 A | 7/1989 | Nakanishi |

(Continued)

FOREIGN PATENT DOCUMENTS

JP   WO2018179180 A1   10/2018

OTHER PUBLICATIONS

Non Final Office Action dated Mar. 18, 2020 for U.S. Appl. No. 15/984,231 "Force Sensing Resistor (FSR) With Polyimide Substrate, Systems, and Methods Thereof", Campbell, 12 pages.
(Continued)

*Primary Examiner* — Jasson H Yoo
(74) *Attorney, Agent, or Firm* — Lee & Hayes, P.C.

(57) ABSTRACT

A method including receiving at least one of touch data or force data representing a touch input received at the controller, determining one or more model(s), generating image data using the one or more models, the image data representing at least a hand gesture corresponding to the touch input received at the controller, and transmitting the image data to a virtual reality (VR) environment for display.

20 Claims, 13 Drawing Sheets

Related U.S. Application Data which is a continuation-in-part of application No. 15/679,521, filed on Aug. 17, 2017, now Pat. No. 10,391,400, which is a continuation-in-part of application No. 29/580,635, filed on Oct. 11, 2016, now Pat. No. Des. 806,173.

(60) Provisional application No. 62/687,780, filed on Jun. 20, 2018, provisional application No. 62/520,958, filed on Jun. 16, 2017.

(51) Int. Cl.
  *A63F 13/428* (2014.01)
  *G06F 3/038* (2013.01)
  *A63F 13/67* (2014.01)
  *G06F 3/03* (2006.01)
  *G06F 3/0354* (2013.01)
  *G06F 3/0346* (2013.01)

(52) U.S. Cl.
  CPC ........ *G06F 3/0346* (2013.01); *G06F 3/03547* (2013.01); *G06T 19/006* (2013.01)

(56) References Cited

U.S. PATENT DOCUMENTS

| | | | |
|---|---|---|---|
| 5,184,120 A | 2/1993 | Schultz | |
| 5,302,936 A | 4/1994 | Yaniger | |
| 5,912,612 A | 6/1999 | DeVolpi | |
| 6,097,374 A * | 8/2000 | Howard | G06F 3/011 345/157 |
| 6,285,276 B1 | 9/2001 | Nedele et al. | |
| 6,388,556 B1 | 5/2002 | Imai et al. | |
| 6,829,942 B2 | 12/2004 | Yanai et al. | |
| 7,112,755 B2 | 9/2006 | Kitano et al. | |
| 7,932,892 B2 | 4/2011 | Chen et al. | |
| 8,062,126 B2 | 11/2011 | Marks et al. | |
| 8,274,358 B2 | 9/2012 | Ando et al. | |
| 8,586,882 B2 | 11/2013 | Tanaka et al. | |
| 8,636,199 B1 | 1/2014 | Slayden et al. | |
| 8,816,964 B2 | 8/2014 | Edwards | |
| 9,508,504 B2 | 11/2016 | Suzuki et al. | |
| 9,690,408 B1 | 6/2017 | Krah | |
| 9,696,223 B2 | 7/2017 | Lisseman et al. | |
| 10,307,669 B2 | 6/2019 | Hope et al. | |
| 10,353,506 B2 | 7/2019 | Vosgueritchian et al. | |
| 10,386,224 B2 | 8/2019 | Shim et al. | |
| 10,444,094 B1 | 10/2019 | Ocampo | |
| 2001/0035856 A1 | 11/2001 | Myers | |
| 2002/0010020 A1 | 1/2002 | Johnson | |
| 2002/0175894 A1 | 11/2002 | Grillo | |
| 2003/0043014 A1 | 3/2003 | Nakazawa et al. | |
| 2003/0090465 A1 | 5/2003 | Dellinger | |
| 2004/0012557 A1 | 1/2004 | Daniel | |
| 2005/0172734 A1 | 8/2005 | Alsio et al. | |
| 2005/0179644 A1 | 8/2005 | Alsio et al. | |
| 2005/0259069 A1 | 11/2005 | Baker et al. | |
| 2006/0146018 A1 | 7/2006 | Arneson et al. | |
| 2006/0293864 A1 | 12/2006 | Soss | |
| 2007/0078316 A1 | 4/2007 | Hoarau et al. | |
| 2007/0119698 A1 | 5/2007 | Day | |
| 2007/0146349 A1 | 6/2007 | Errico et al. | |
| 2007/0249422 A1 | 10/2007 | Podoloff | |
| 2007/0279380 A1 | 12/2007 | Murillo | |
| 2008/0136778 A1 | 6/2008 | Hursh | |
| 2008/0146336 A1 | 6/2008 | Feldman et al. | |
| 2008/0261693 A1 | 10/2008 | Zalewski | |
| 2008/0311990 A1 | 12/2008 | Chiu et al. | |
| 2009/0005166 A1 | 1/2009 | Sato | |
| 2009/0256817 A1 | 10/2009 | Perlin et al. | |
| 2009/0305786 A1 | 12/2009 | Chang | |
| 2010/0194682 A1 | 8/2010 | Orr et al. | |
| 2010/0245239 A1 | 9/2010 | Sternberg | |
| 2011/0059796 A1 | 3/2011 | Kondo et al. | |
| 2011/0080339 A1 | 4/2011 | Sun et al. | |
| 2011/0084932 A1 | 4/2011 | Simmons et al. | |
| 2011/0159959 A1 | 6/2011 | Mallinson et al. | |
| 2011/0221564 A1 | 9/2011 | Deppiesse et al. | |
| 2012/0088580 A1 | 4/2012 | Takeda et al. | |
| 2012/0143091 A1 | 6/2012 | Annett et al. | |
| 2012/0214594 A1 | 8/2012 | Kirovski et al. | |
| 2013/0027341 A1 | 1/2013 | Mastandrea | |
| 2013/0063342 A1 | 3/2013 | Chen et al. | |
| 2013/0096849 A1 | 4/2013 | Campbell et al. | |
| 2014/0015633 A1 | 1/2014 | Nakae et al. | |
| 2014/0098018 A1 | 4/2014 | Kim et al. | |
| 2014/0240267 A1 | 8/2014 | Luo | |
| 2014/0274397 A1 | 9/2014 | Sebastian | |
| 2015/0091858 A1 | 4/2015 | Rosenberg et al. | |
| 2015/0120777 A1 | 4/2015 | Ramos | |
| 2015/0352437 A1 | 12/2015 | Koseki et al. | |
| 2015/0359457 A1 * | 12/2015 | Blumenthal | A63F 13/218 73/172 |
| 2016/0026253 A1 | 1/2016 | Bradski et al. | |
| 2016/0030835 A1 | 2/2016 | Argiro | |
| 2016/0085355 A1 | 3/2016 | Pirogov et al. | |
| 2016/0124500 A1 | 5/2016 | Lee et al. | |
| 2016/0246369 A1 | 8/2016 | Osman | |
| 2016/0259404 A1 | 9/2016 | Woods | |
| 2016/0283008 A1 | 9/2016 | Perlin et al. | |
| 2016/0306932 A1 | 10/2016 | Fateh et al. | |
| 2016/0317267 A1 | 11/2016 | Meerbeek et al. | |
| 2016/0342218 A1 | 11/2016 | Burba et al. | |
| 2016/0356658 A1 | 12/2016 | Hou et al. | |
| 2016/0357261 A1 | 12/2016 | Bristol et al. | |
| 2016/0364002 A1 * | 12/2016 | Gates | G06F 3/017 |
| 2017/0031503 A1 | 2/2017 | Rosenberg et al. | |
| 2017/0139481 A1 | 5/2017 | Long | |
| 2017/0177102 A1 | 6/2017 | Long | |
| 2017/0192506 A1 | 7/2017 | Andersen et al. | |
| 2017/0205903 A1 | 7/2017 | Miller et al. | |
| 2017/0351345 A1 | 12/2017 | Nirjon et al. | |
| 2018/0025531 A1 | 1/2018 | Terahata | |
| 2018/0067545 A1 | 3/2018 | Provancher et al. | |
| 2018/0099219 A1 | 4/2018 | Hope et al. | |
| 2018/0161670 A1 | 6/2018 | Boev | |
| 2018/0188816 A1 | 7/2018 | Liu et al. | |
| 2018/0264357 A1 | 9/2018 | Dalton et al. | |
| 2018/0272232 A1 | 9/2018 | Campbell et al. | |
| 2019/0009172 A1 | 1/2019 | Sawai et al. | |
| 2019/0076716 A1 | 3/2019 | Chiou et al. | |
| 2019/0102927 A1 * | 4/2019 | Yokokawa | G06F 3/014 |
| 2019/0232160 A1 | 8/2019 | Hope et al. | |
| 2019/0308110 A1 | 10/2019 | Muramatsu et al. | |
| 2019/0325651 A1 | 10/2019 | Bradner et al. | |
| 2019/0344173 A1 | 11/2019 | Mucha et al. | |
| 2020/0218377 A1 | 7/2020 | Dalton et al. | |
| 2020/0246691 A1 | 8/2020 | Petersen et al. | |

OTHER PUBLICATIONS

Final Office Action dated Feb. 4, 2020 for U.S. Appl. No. 16/010,385 "Electronic Controller with Finger Motion Sensing" Nietfeld, 12 pages.

Non Final Office Action dated Sep. 18, 2019 for U.S. Appl. No. 16/289,420 "Sensor Fusion Algorithms for a Handheld Controller That Includes a Force Sensing Resistor (FSR)" Leinbaugh, 13 pages.

Non Final Office Action dated Sep. 19, 2019 for U.S. Appl. No. 15/984,231 "Force Sensing Resistor (FSR) With Polyimide Substrate, Systems, and Methods Thereof" Campbell, 35 pages.

PCT Search Report and Written Opinion dated Oct. 8, 2019 for PCT Application No. PCT/US19/32982, 11 pages.

PCT Search Report and Written Opinion dated Sep. 17, 2019 for PCT Application No. PCT/US2019/037802, 7 pages.

Brown et al, "5 improvements we're excited to see from Valve's 'Knuckles' controllers", retrieved on Jan. 20, 2019 at <<https://www.vrheads.com/5-Improvements-were-exclted-see-valves-knuckles-controllers>>, VR Heads, Jul. 11, 2017.

Non Final Office Action dated Jan. 8, 2019 for U.S. Appl. No. 15/679,521 "Electronic Controller With Hand Retainer and Finger Motion Sensing" Mucha, 11 pages.

(56) References Cited

OTHER PUBLICATIONS

Non Final Office Action dated Jan. 8, 2019 for U.S. Appl. No. 15/834,425 "Electronic Controller with a Hand Retainer, outer shell, and finger sensing" Hope, 11 pages.
Non Final Office Action dated Jan. 18, 2019 for U.S. Appl. No. 15/834,425 "Electronic Controller with a Hand Retainer, outer shell, and finger sensing" Hope, 20 pages.
PCT Search Report and Written Opinion dated Feb. 6, 2019 for PCT Application No. PCT/US2018/064116, 8 pages.
PCT Search Report and Written Opinion dated Feb. 8, 2019 for PCT Application No. PCT/US2018/064120, 11 pages.
Freescale Semiconductor, Inc. "Touch Sensors", 2009, <<https://www.freescale.com/touch>>, 2 pages.
Invitation to Pay Fees dtd Aug. 6, 2019 for Application PCT/US2019/32982 "Sensor Fusion Algorithms for a Handheld Controller That Includes a Force Sensing Resistor (FSR)", 2 pages.
Non Final Office Action dated Jul. 15, 2019 for U.S. Appl. No. 16/010,385 "Electronic Controller with Finger Motion Sensing" Nietfeld, 11 pages.
Non Final Office Action dated Jul. 23, 2019 for U.S. Appl. No. 15/984,245 "Sensor Fusion Algorithms for a Handheld Controller That Includes a Force Sensing Resistor (FSR)" Dalton, 18 pages.
Final Office Action dated Jul. 29, 2019 for U.S. Appl. No. 15/834,425 "Electronic Controller with a Hand Retainer, outer shell, and finger sensing" Hope, 23 pages.
PCT Search Report and Written Opinion dated Jul. 24, 2019 for PCT Application No. PCT/US19/32928, 4 pages.
PCT Search Report and Written Opinion dated Aug. 15, 2019 for PCT Application No. PCT/US2019/032968, 12 pages.
PCT Search Report and Written Opinion dated Sep. 10, 2019 for PCT Application No. PCT/US2019/037794, 10 pages.
Non Final Office Action dated Jun. 12, 2020 for U.S. Appl. No. 16/392,497, "Electronic Controller With Finger Sensing and an Adjustable Hand Retainer", Petersen, 13 pages.
Non Final Office Action dated Jun. 18, 2020 for U.S. Appl. No. 16/377,058, "Electronic Controller With Finger Sensing and an Adjustable Hand Retainer", Hope, 18 pages.
Non Final Office Action dated Jul. 20, 2020 for U.S. Appl. No. 16/389,499, "Holding and Releasing Virtual Objects", Bradner, 22 pages.
PCT Search Report and Written Opinion dated Jul. 1, 2020 for PCT Application No. PCT/US2020/028517, 13 pages.
Valve, "Knuckles EV2: Adjust Strap", YouTube, Jun. 2018, retrieved from internet:<URL: https:llwww.youtube.com/watch?time_continue=6&v=H ExyOQX5POs&feature=emb title>, 18 pages.
Valve Corporation, "Knuckles EV2: What's New", Sep. 2018, retrieved from Internet <URL:https://steamcommunity com/sharedfiles/filedetails/?id=1411984190>, 7 Pages.

\* cited by examiner

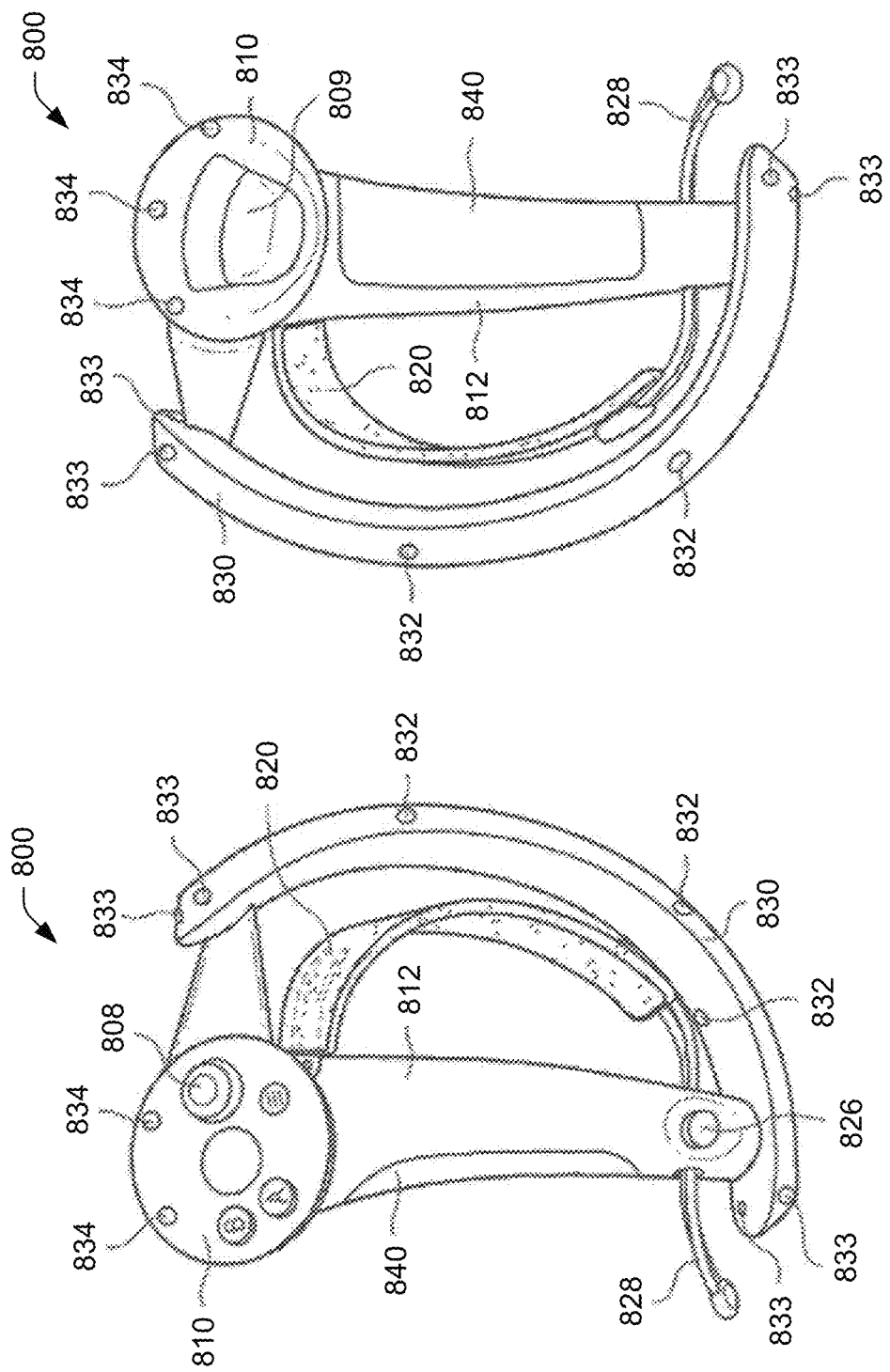

(SECTION A-A)

VIRTUAL REALITY HAND GESTURE GENERATION

CROSS-REFERENCE TO RELATED APPLICATIONS

This application claims priority under 35 U.S.C. § 120 as a continuation to U.S. Provisional Patent Application Ser. No. 62/687,780, filed on 20 Jun. 2018 and entitled "VIRTUAL REALITY HAND GESTURE GENERATION."

Further, this application claims priority under 35 U.S.C. § 120 as a continuation-in-part to pending U.S. patent application Ser. No. 15/834,372 filed on 7 Dec. 2017, entitled "ELECTRONIC CONTROLLER WITH FINGER SENSING AND AN ADJUSTABLE HAND RETAINER," which itself claims priority as a continuation-in-part to U.S. patent application Ser. No. 15/679,521 filed on 17 Aug. 2017, entitled "ELECTRONIC CONTROLLER WITH HAND RETAINER AND FINGER MOTION SENSING," which itself claims priority as a continuation-in-part to U.S. patent application Ser. No. 29/580,635 filed on 11 Oct. 2016, and claims priority to U.S. Provisional Patent Application 62/520,958 filed on 16 Jun. 2017.

BACKGROUND

The video game industry has spawned many innovations in both hardware and software. For example, various handheld video game controllers have been designed, manufactured, and sold for a variety of game applications. Some of the innovations have applicability outside of the video game industry, such as controllers for industrial machines, defense systems, robotics, etc.

In addition, virtual reality (VR) systems are an application of great contemporary interest and rapid technical advancement, both within and outside the video game industry. The controllers for VR systems have to perform several different functions and meet strict (and sometimes competing) design constraints while often optimizing certain desired characteristics. In some instances, these controllers include sensors for measuring a force of a user's grip, which in turn is used for performing a predefined gameplay function. Various types of sensors have been utilized in an effort to meet these objectives, including, among others, a force sensing resistor (FSR), which uses variable resistance to measure an amount of force applied to the FSR. However, existing controllers with FSRs tend to exhibit fairly crude response times. Additionally, the controller may fail to accurately depict and sense hand positions, gestures, and/or movement throughout a gameplay experience.

BRIEF DESCRIPTION OF THE DRAWINGS

FIG. 8A depicts a front view of the example right-hand controller according to another example embodiment of the present disclosure.

FIG. 8B depicts a back view of the example right-hand controller of FIG. 8A.

DETAILED DESCRIPTION

Figure 1:
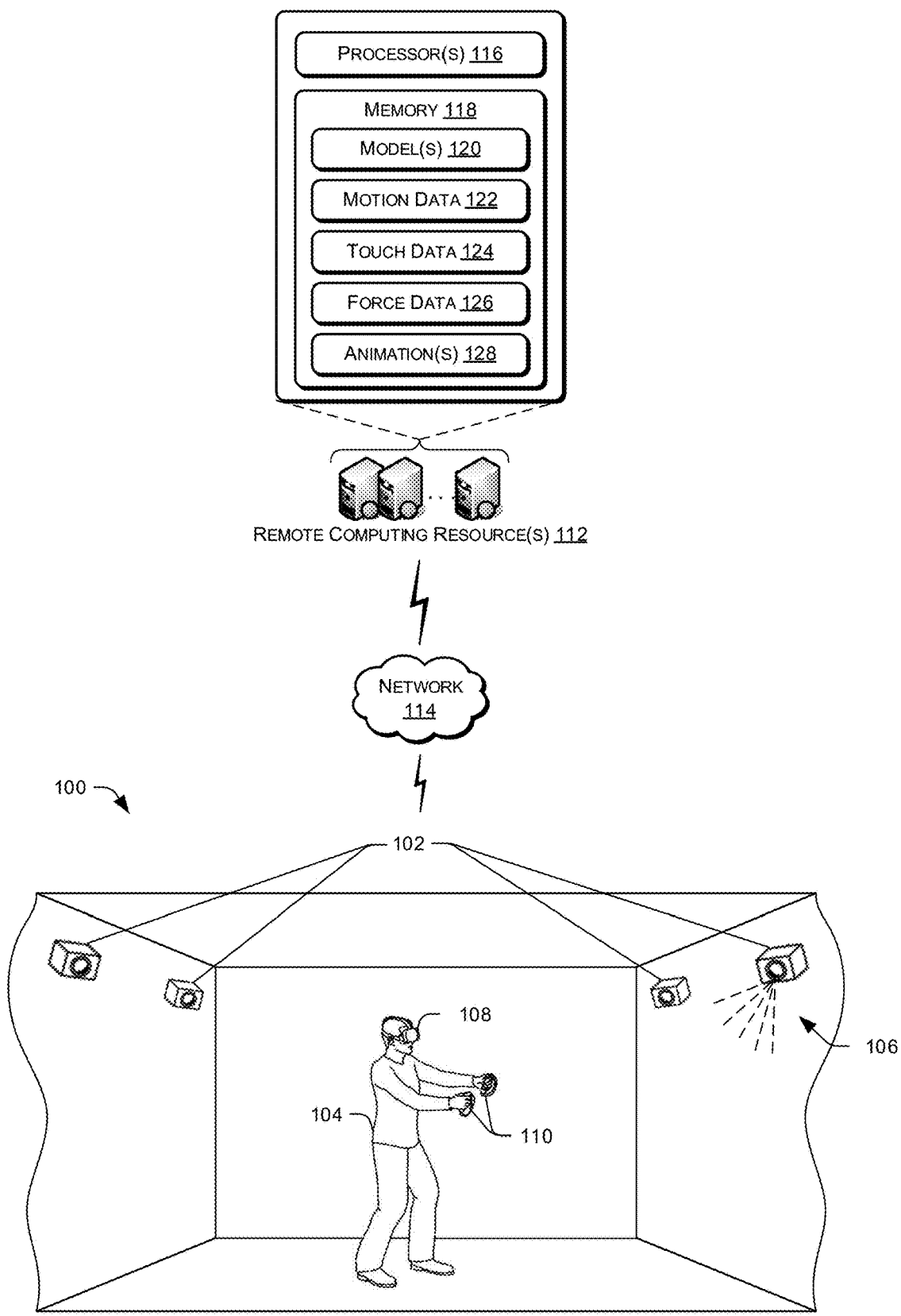
FIG. 1 depicts an environment of a user interacting with a virtual reality (VR) system according to an example embodiment of the present disclosure.

Disclosed herein are motion capture system(s) and controllers for use in virtual reality (VR) environments. An example motion capture system may include cameras, projectors, and/or other sensors positioned about an environment to track a movement of the controller, as well as movement of a user operating the controller. For instance, a plurality of cameras may mount within the environment and capture images of the controller and the user. In some instances, the plurality of cameras may capture some or all angles and positions within the environment. Alternatively, the plurality of cameras may focus on or capture images within a predefined range or area of the environment. As the controller maneuvers about the environment and as the user maneuvers his or her hands, the cameras may detect positions and orientations of the user and/or the controller(s), respectively.

In some instances, to detect the position of the controller (or portions thereof) and the user, the controller(s) and/or the user may include markers, respectively. For instance, the markers may couple to the controller and/or the user. The markers may include a digital watermark, an infrared reflector, or the like. The motion capture system(s) may project light into the environment, which is then reflected by the markers. The cameras may capture incident light reflected by the markers and the motion capture system(s) may track and plot the locations of the markers within the environment to determine movements, positions, and/or orientations of the controller and/or the user.

An example controller may be held by the user and may include one or more force sensing resistors (FSRs) or other types of sensors that detect touch input from the user. In some instances, an FSR may couple to a surface of the controller, such as a structure mounted within a handle of the controller and/or a structure mounted underneath at least one thumb-operated control of the controller. In some instances, the FSR may measure a resistance value that corresponds to an amount of force applied by the user. The FSR may also associate the force(s) with a particular location, region, and/or portion of the controller. For example, the FSR may determine an amount of force applied to an outer surface of the handle and/or may determine location(s) on the controller corresponding to touch input from the user. In some embodiments, the controller may determine, via force data generated by the FSR, an amount of force in which the user squeezes the handle of the controller and/or an amount of force with which the user presses buttons on the controller. The controller may translate presses or squeezes of varying force into digitized numerical values used for video game control and/or game mechanics.

In some instances, the FSR may act as a switch to detect when an applied force exceeds a threshold, which in some instances, may dynamically update and/or adjust. For example, the threshold may adjust to a lower value to reduce hand fatigue during gameplay (e.g., when the user presses a control associated with the FSR to shoot a weapon frequently during gameplay). Conversely, the threshold may adjust to a higher value to reduce instances of accidental control operation.

The controller may also include an array of proximity sensors that are spatially distributed along a length of the handle and that are responsive to a proximity of the user's fingers. The proximity sensors may include any suitable technology, such as capacitive sensors, for sensing a touch input and/or a proximity of the hand of the user relative to the controller. The array of proximity sensors may generate touch data that indicates a location of finger(s) grasping the controller or when the user is not grasping the controller, a distance disposed between the handle and the fingers of the user (e.g., through measuring capacitance). In some instances, the proximity sensors may also detect a hand size of the user grasping the controller, which may configure the controller according to different settings. For instance, depending on the hand size, the controller may adjust to make force-based input easier for users with smaller hands.

Implementing the motion capture system and the controller for use in a VR environment may allow for expanding the spectrum of natural interaction beyond its current state using conventional controllers. For instance, in conjunction with one another, the motion capture system(s) may capture motion data of the hand and/or the controller, while the controller may capture touch data corresponding to touch inputs at the controller and force data associated with the touch inputs of the user. The motion data, the touch data, and/or the force data may be associated with one another to generate models that are indicative of hand gestures of the user.

To illustrate, the user may include markers placed on his or her knuckles, finger tips, wrist, joints, and so forth. The controller may also include markers (e.g., top, bottom, sides, etc.). Noted above, the marker(s) may reflect incident light. The motion capture system may detect and record movements of the user's hand(s) and the position of the controller(s) via the cameras detecting positions of the markers. For instance, the projectors of the motion capture system(s) may project infrared light, which is then reflected by the markers on the hand and/or the controller. The cameras of the motion capture system(s) may capture images of the environment. The images are utilized to indicate the positions of the markers within the environment. The positions of the markers are tracked over time and animated within a three-dimensional (3D) virtual space. This tracking may allow for the generation of animated 3D skeletal data (or models). For instance, the user may grip the controller with a clinched first or two fingers (e.g., pinky finger and ring finger). The cameras may capture the positions of the user's finger tips, knuckles, and/or other portions of the hand, wrist, and/or arm via the markers. In some instances, the positions are relative to the controller.

At the same time, or at a different time, the array of proximity sensors may detect touch input, or a lack of touch input, at the controller. The touch data may indicate the locations of the fingers of the user relative to the controller, for instance, through measuring capacitance. The capacitance may vary with the distance disposed between the finger and the controller. In doing so, the controller may detect when the user grips the controller with one finger, two fingers, three fingers, and so forth. With the capacitance, the controller may also detect the relative placement of the fingers with respect to the controller, such as when the fingers of the user are not touching the controller.

Additionally, the FSR may capture force data representative of force values received by the controller(s) (e.g., forces in which the user grips the controller). For instance, as the user grips the controller body with a clinched first or two fingers, the FSR may capture force values corresponding to these respective grips. As an example, the FSR may detect an increase in force values when the user grips the controller with a clinched first as compared to when the user grips the controller with two fingers.

The touch data and the force data may be associated with one another. For instance, when the user grips the controller with four fingers, the force values detected on the controller may be associated with certain locations of the controller. In doing so, the touch data and the force data may be associated with one another to determine which fingers of the user grasp the controller, as well as the relative force each finger the user grasps the controller. The same may be said when the user grips the controller with two fingers, where force values are detected and associated with certain portions of the controller body. Knowing where the touch input is received, from the array of proximity sensors, as well as the amount of force the user grips the controller, as detected by the FSR, the controller and/or another communicatively coupled remote system may associate the touch input with certain fingers of the user. In some instances, through correlating time stamps associated with the touch data with time stamps of the force data, the controller (or another communicatively coupled remote system) may associate the touch data and the force data The amount of force with which the user grips the controller (i.e., the force data), the location of the touch input or lack thereof on the controller (i.e., the touch data), as well as motion captured by the camera of the motion capture system (i.e., the motion data), may train models that indicate hand gestures of the user. As an example, the motion capture system may associate a clinched first (e.g., using the motion data) with the touch data and/or the force data received at the controller. By way of another example, if the user grips the controller with two fingers, the motion data may indicate the hand gesture (e.g., two finger grip) while the touch data may indicate the proximity of the hand (or fingers) to the controller and the force data may indicate how firm a user grips the controller. Using these associations, models may be generated and trained to indicate gestures of the user. The models may continuously be trained to become more accurate overtime.

The models may characterize touch input at the controller and/or force values associated with the touch input to generate animations of a hand gesture on a display and the VR environment may utilize the models for use in gameplay. More particularly, the models may input the touch data and/or the force data to generate hand gestures within the VR environment. As examples, the gestures may include various video game controls, such as crushing a rock or squeezing a balloon (e.g., clinched first gesture), toggling through available weapons usable by a game character (e.g., scrolling or sliding fingers along the controller), dropping objects (e.g., open hand gesture), firing a weapon (e.g., pinky finger, ring finger, middle finger touching the controller but index finger and thumb are pointed outward), and so forth. That is, knowing the location of the touch input on the controller, as well as the force in which the user grips the controller. This information may be used in conjunction with the previously trained models to generate a hand gesture (e.g., clinched first) within the VR environment and/or on a VR display. Further, the model(s) may utilize previously generated animations and/or image data when rendering and/or generating the hand gestures for display.

Illustrative Virtual Reality (VR) Environment

FIG. 1 depicts an example environment 100 in which a motion capture system(s) 102 and a user 104 reside. The motion capture system(s) 102 is shown mounted to walls of the environment 100, however, in some instances, the motion capture system(s) 102 may mount elsewhere within the environment 100 (e.g., ceiling, floor, etc.). Moreover, although FIG. 1 illustrates four motion capture system(s) 102, the environment 100 may include more than or less than four motion capture system(s) 102.

The motion capture system(s) 102 may include projector(s) configured to generate and project light and/or images 106 within/into the environment 100. The images 106 may include visible light images perceptible to the user 104, visible light images imperceptible to the user 104, images with non-visible light, and/or a combination thereof. The projector(s) may include any number of technologies capable of generating the images 106 and projecting the images 106 onto a surface or objects within the environment 100. In some examples, suitable technologies may include a digital micromirror device (DMD), liquid crystal on silicon display (LCOS), liquid crystal display, 3LCD, and so forth. The projector(s) may have a field of view which describes a particular solid angle and the field of view may vary according to changes in the configuration of the projector(s). For example, the field of view may narrow upon application of a zoom.

The motion capture system(s) 102 may include high resolution cameras, infrared (IR) detectors, sensors, and so forth. The camera(s) may image the environment 100 in visible light wavelengths, non-visible light wavelengths, or both. The camera(s) also have a field of view that describes a particular solid angle and the field of view of the camera may vary according to changes in the configuration of the camera(s). For example, an optical zoom of the camera(s) may narrow the camera field of view.

In some instances, the environment 100 may include a plurality of cameras and/or a varying type of camera. For instance, the cameras may include a three-dimensional (3D), an infrared (IR) camera, and/or a red-green-blue (RGB) camera. In some instances, the 3D camera and the IR camera may capture information for detecting depths of objects within the environment (e.g., markers) while the RGB camera may detect edges of objects by identifying changes in color within the environment 100. In some instances, the motion capture system(s) 102 may include a single camera configured to perform all of the aforementioned functions.

One or more components of the motion capture system(s) 102 may mount to a chassis with a fixed orientation or may mount to the chassis via an actuator, such that the chassis and/or the one or more components may move. As examples, the actuators may include piezoelectric actuators, motors, linear actuators, and other devices configured to displace or move the chassis and/or the one more components mounted thereto, such as the projector(s) and/or the camera(s). For example, the actuator may comprise a pan motor, a tilt motor, and so forth. The pan motor may rotate the chassis in a yawing motion while the tilt motor may change the pitch of the chassis. In some instances, the chassis may additionally or alternatively include a roll motor, which allows the chassis to move in a rolling motion. By panning, tilting, and/or rolling the chassis, the motion capture system(s) 102 may capture different views of the environment 100.

The motion capture system(s) 102 may also include a ranging system. The ranging system may provide distance information from the motion capture system(s) 102 to a scanned entity, object (e.g., the user 104 and/or the controller 110), and/or a set of objects. The ranging system may comprise and/or use radar, light detection and ranging (LIDAR), ultrasonic ranging, stereoscopic ranging, structured light analysis, time-of-flight observations (e.g., measuring time-of-flight round trip for pixels sensed at a camera), and so forth. In structured light analysis, and as noted above, the projector(s) may project a structured light pattern within the environment 100 and the camera(s) may capture an image of the reflected light pattern. The motion capture system(s) 102 may analyze a deformation in the reflected pattern, due to a lateral displacement between the projector and the camera, to determine depths or distances corresponding to different points, areas, or pixels within the environment 100.

The motion capture system(s) 102 may determine or know distance(s) between the respective components of the motion capture system(s) 102, which may aid in the recovery of the structured light pattern and/or other light data from the environment 100. The motion capture system(s) 102 may also use the distances to calculate other distances, dimensions, and/or otherwise aid in the characterization of entities or objects within the environment 100. In implementations where the relative angle and size of the projector field of view and camera field of view may vary, the motion capture system(s) 102 may determine and/or know such dimensions.

Within the environment 100, the user 104 may wear a VR headset 108 and hold the controllers 110. The VR headset 108 may include an internal display (not shown) that presents a simulated view of a virtual environment, gameplay, or shows objects within virtual space. The VR headset 108 may include a headband along with additional sensors. In some embodiments, the VR headset 108 may comprise a helmet or cap and include sensors located at various positions on the top of the helmet or cap to receive optical signals.

Discussed in detail herein, the user 104 and/or the controllers 110 may include markers. The motion capture system(s) 102, via the projector(s) projecting light and the camera(s) capturing images of the reflections of the markers, may detect a position of the user 104 and/or the controllers 110 within the environment 100. The markers may be utilized to determine an orientation and/or position of the user 104, or portions of the user 104 (e.g., hands or fingers) within the environment 100, as well as an orientation and/or position of the controller 110 within the environment 100. The ranging system may also aid in determining locations of the user 104 (or portions thereof) and the controllers 110 through determining distances between the motion capture system(s) 102 and the markers.

The motion capture system(s) 102, the VR headset 108, and/or the controllers 110 may communicatively couple to one or more remote computing resource(s) 112. The remote computing resource(s) 112 may be remote from the environment 100 and the motion capture system(s) 102, the VR headset 108, and/or the controllers 110. For instance, the motion capture system(s) 102, the VR headset 108, and/or the controllers 110 may communicatively couple to the remote computing resource(s) 112 over a network 114. In some instances, the motion capture system(s) 102, the VR headset 108, and/or the controllers 110 may communicatively couple to the network 114 via wired technologies (e.g., wires, USB, fiber optic cable, etc.), wireless technologies (e.g., RF, cellular, satellite, Bluetooth, etc.), and/or other connection technologies. The network 114 is representative of any type of communication network, including data and/or voice network, and may be implemented using wired infrastructure (e.g., cable, CAT5, fiber optic cable, etc.), a wireless infrastructure (e.g., RF, cellular, microwave, satellite, Bluetooth, etc.), and/or other connection technologies.

The remote computing resource(s) 112 may be implemented as one or more servers and may, in some instances, form a portion of a network-accessible computing platform implemented as a computing infrastructure of processors, storage, software, data access, and so forth that is maintained and accessible via a network such as the Internet. The remote computing resource(s) 112 do not require end-user knowledge of the physical location and configuration of the system that delivers the services. Common expressions associated with these remote computing resource(s) 112 may include "on-demand computing," "software as a service (SaaS)," "platform computing," "network-accessible platform," "cloud services," "data centers," and so forth.

The motion capture system(s) 102, the VR headset 108, and/or the controllers 110 may include one or more communication interfaces to facilitate the wireless connection to the network 114 and/or to one or more remote computing resource(s) 112. Additionally, the one or more communication interfaces may also permit transmission of data between the motion capture system(s) 102, the VR headset 108, and/or the controllers 110 (e.g., communication between one another). In some instances, however, the one or more communication interfaces may also include wired connections.

The remote computing resource(s) 112 include a processor(s) 116 and memory 118, which may store or otherwise have access to one or more model(s) 120. The remote computing resource(s) 112 may receive motion data 122 from the motion capture system(s) 102 and touch data 124 and/or force data 126 from the controllers 110. The touch data 124 may include a touch profile indicating a location (or locations) on the controller(s) 110 corresponding to touch input of the user. The touch data 124 may also indicate a lack of touch input on the controller(s) 110. In doing so, the touch data 124 may indicate which finger(s) is/are touching the controller, and/or what portions of the finger(s) touch the controller(s) 110. In some instances, an array of proximity sensors (e.g., capacitive sensors) spatially distributed along a handle of the controller 110 may detect the touch input and generate and/or transmit the touch data to the remote computing resource(s) 112. Additionally, the FSR may generate force data 126 that indicates force values of the touch input on the controller 110. As described herein, the touch data 124 and/or the force data 126 may indicate a hand position, grip, or gesture of the hand within the VR environment. In turn, the remote computing resource(s) 112 may transmit animation(s) 128 or other image data to the VR headset 108 for display.

Discussed in detail herein, the remote computing resource(s) 112 may utilize the model(s) 120 to generate the animations 128 displayed on the VR headset 108. In some instances, the remote computing resource(s) 112 may generate and/or train the model(s) 120 using the motion data 122, the touch data 124, and/or the force data 126. The remote computing resource(s) 112 may generate and/or train the model(s) 120 through interactions with users and receiving the motion data 122, the touch data 124, and/or the force data 126. The processor(s) 116 may analyze the motion data 122 and correlate the motion data 122 with the touch data 124 and/or the force data 126. Additionally, the processor(s) 116 may analyze the touch data 124 and associate the touch data 124 with the force data 126.

The processor(s) 116 may correlate a time associated with a capture of the motion data 122 to learn characteristics of the users. For instance, the processor(s) 116 may learn characteristics of the touch data 124 (e.g., location on the controller 110) and/or the force data 126 and associate these characteristics with particular gestures of the hand. After performing the data analysis, the processor(s) 116 may generate the model(s) 120 to correlate the motion data 122, the touch data 124, and/or the force data 126. In other words, the processor(s) 116 may analyze the touch data 124 and/or the force data 126 to correlate or otherwise associate the touch data 124 and/or the force data 126 with hand gestures, as represented by the motion data 122. Training the model(s) 120 based on the motion data 122, the touch data 124, and/or the force data 126 permits the model(s) 120 to determine hand gestures using the touch data 124 and/or the force data 126 received in subsequent interactions by users (i.e., during gameplay). That is, the model(s) 120 may receive the touch data 124 and/or the force data 126 as inputs, and utilize the touch data 124 and/or the force data 126 to determine a hand gesture of the user 104. For example, when a user is holding the controller 110, the controller 110 may receive the touch data 124 generated by the array of the proximity sensors, where the touch data 124 indicates a location of the touch input at the controller 110. The touch data 124 may also indicate a proximity of the hand of the user with respect to the controller 110 through measuring a capacitance value between fingers of the user and the controller 110. For instance, the user may hover his or her fingers above the controller 110. The controller 110 may transmit the touch data 124 to the remote computing resource(s) 112, where the touch data 124 is input into the model(s) 120. Additionally, the FSR of the controller 110 may generate the force data 126 indicating an amount of force associated with the touch input. The controller 110 may transmit the force data 126 to the remote computing resource(s) 112.

Upon receiving the touch data 124 and/or the force data 126 from the controller(s) 110, the processor(s) 116 may select one or more of the model(s) 120 based on characteristics of the touch data 124 and/or the force data 126. For example, the processor(s) 116 may select certain model(s) 120 for generating hand gestures based on the amount of force the user 104 grips the controller 110 (using the force data 126) and/or a location of the grip of the user 104 on the controller 110 (using the touch data 124).

Additionally, in some instances, the processor(s) 116 may select the model(s) 120 based in part on other user characteristics, such as on user interests, gender, age, etc. For instance, depending on how the user 104 holds the controller 110 and/or where the controller 110 receives touch input, the processor(s) 116 may identify an age and/or hand size of the user 104. Such information may be utilized to select different model(s) 120 and/or generate the animation(s) 128 representative of the hands of the user 104.

For instance, the processor(s) 116 may input the touch data 124 into the model(s) 120. The processor(s) 116, using the model(s) 120, may generate the animation(s) 128 corresponding to the touch data 124 and/or the force data 126. By way of an example, using the touch data 124 and/or the force data 126, and through inputting the touch data 124 and/or the force data 126 into the model(s) 120, the processor(s) 116 may determine the user is holding the controller 110 with a clinched fist. The processor(s) 116 may generate the animation 128 depicting the clinched first of the user 104 and transmit the animation 128 to the VR headset 108 for display.

In some instances, the processor(s) 116 may utilize rankings to determine the most probabilistic hand gesture represented by the touch data 124 and/or the force data 126 utilizing profiles stored in association with the model(s) 120. For instance, the processor(s) 116 may compare the touch data 124 and/or the force data 126 to a portion of the model(s) 120 or all of the model(s) 120 to determine a probability that particular hand gestures correspond to the touch input of the user. In such instances, the model(s) 120 may be stored in association with touch data 124 that indicates a location of touch input received at the controller 110 and/or force data 126 that indicates a relative force of the touch input at the controller 110. In such instances, the touch data 124 and/or the force data 126 may characterize the model(s) 120. Accordingly, during gameplay, when the remote computing resource(s) 112 receives touch data 124 and/or the force data 126, the remote computing resource(s) 112 may select one or more model(s) 120 to generate the animation 128 by comparing the received touch data 124 and/or the force data 126 with the touch data and/or the force data stored in association with the model(s) 120, respectively.

In some instances, the remote computing resource(s) 112 may also perform predictive modeling for future events. The predictive modeling may determine a probability of whether an outcome may occur or may not occur. For instance, the processor(s) 116 may determine a probability of future hand gestures utilizing the motion data 122, the touch data 124, and/or the force data 126 available from the memory 118. By way of example, after receiving first touch data 124 and/or first force data 126, and inputting the touch data 124 and/or the force data 126 into the model(s) 120 to determine a first hand gesture, the processor(s) 116 may predict a forthcoming second hand gesture and generate the second hand gesture for display on the VR headset 108. That is, the processor(s) 116 may utilize previous motion data 122, touch data 124, and/or force data 126 to predict future hand gestures of the user 104 and generate corresponding animation(s) 128. In some instances, the prediction may reduce a latency time between gestures generated by the remote computing resource(s) 112 that are displayed on the VR headset 108.

Additionally, the processor(s) 116 may determine a certain probability and/or confidence associated with a predicted gesture. For instance, if a predicted second hand gesture is within a certain confidence level or threshold, the processor(s) 116 may generate an animation(s) 128 corresponding to the second hand gesture and provide the gesture to the VR headset 108 for display.

In some instances, validation operations, such as statistical analysis techniques, may validate an accuracy of the model(s) 120. That is, as noted above, through iteratively capturing the motion data 122, the touch data 124, and/or the force data 126, the processors(s) 116 may train the model(s) 120 to better correlate the touch data 124 and/or the force data 126 with hand gestures represented within the motion data 122 (e.g., machine learning algorithms or techniques). Training the model(s) 120 may increase the accuracy that the displayed animation(s) 128 is/are representative of the touch data 124 and/or the force data 126 received at the controller 110.

The processor(s) 116 may also include components that learn the model(s) 120 based on interactions with different types of users. For instance, the processor(s) 116 may build and/or refine the model(s) 120, or may learn combinations and/or blendings of existing model(s) 120. The model generation techniques described herein may also include at least one of gradient boosting techniques and/or hyperparameter tuning to train the model(s) 120. Gradient boosting may include, for example, producing a prediction model in the form of an ensemble of weak prediction models, which may be decision trees. The prediction model may be built in a stage-wise fashion and may allow optimization of an arbitrary differential loss function. Hyperparameter tuning may include optimization of hyperparameters during a training process. For example, the model 120 may receive a training data set. In evaluating the aggregate accuracy of the model 120, hyperparameters may be tuned.

Additionally, or alternatively, training the model(s) 120 may involve identifying input features that increase the accuracy of the model(s) 120 and/or other input features that decrease the accuracy of the model(s) 120 or have no or little effect on the model(s) 120. The model(s) 120 may be refitted to utilize the features that increase accuracy while refraining from utilizing the features that decrease accuracy or have no or little effect on accuracy.

As used herein, a processor, such as processor(s) 116, may include multiple processors and/or a processor having multiple cores. Further, the processors may comprise one or more cores of different types. For example, the processors may include application processor units, graphic processing units, and so forth. In one implementation, the processor may comprise a microcontroller and/or a microprocessor. The processor(s) 116 may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that may be used include field-programmable gate arrays (FPGAs), application-specific integrated circuits (ASICs), application-specific standard products (ASSPs), system-on-a-chip systems (SOCs), complex programmable logic devices (CPLDs), etc.

Additionally, each of the processor(s) 116 may possess its own local memory, which also may store program components, program data, and/or one or more operating systems.

The memory 118 may include volatile and nonvolatile memory, removable and non-removable media implemented in any method or technology for storage of information, such as computer-readable instructions, data structures, program component, or other data. Such memory 118 may include, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The memory 118 may be implemented as computer-readable storage media ("CRSM"), which may be any available physical media accessible by the processor(s) 116 to execute instructions stored on the memory 118. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s).

Illustrative Controller

Figure 2:
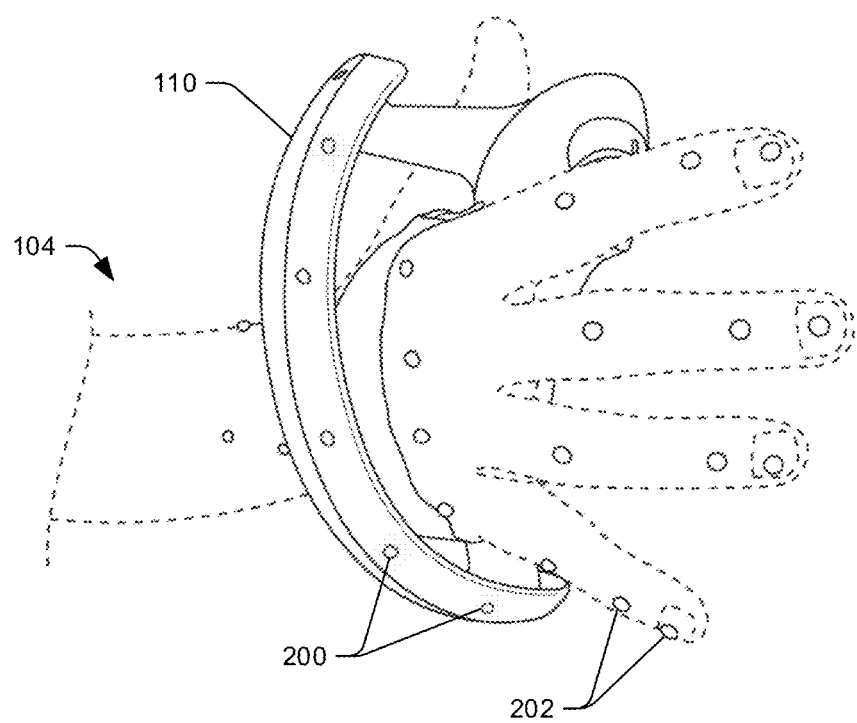
FIG. 2 depicts an example controller in a user's hand according to an example embodiment of the present disclosure.

FIG. 2 shows a user 104 holding a controller 110 (which may represent, and/or be similar to the controller 110 of FIG. 1). The controller 110 may include markers 200, which may couple and/or attach to any portion of the controller 110, such as handles, straps, grips, and so forth. Similarly, portions of the user 104 may include markers 202 that attach on and/or along a hand of the user 104, such as fingertips, knuckles, finger joints, wrists, and so forth. In some instances, the markers 200, 202 may attach to the user 104 and/or the controller 110, respectively, using adhesives.

The markers 200, 202 may include infrared elements, reflectors, and/or images that are responsive to electromagnetic radiation (e.g., infrared light) emitted by the projector(s) of the motion capture system(s) 102. Additionally, or alternatively, the markers 200, 202 may include tracking beacons that emit electromagnetic radiation (e.g., infrared light) captured by the cameras of the motion capture system(s) 102.

As noted above, the motion capture system(s) 102 may scan at least a portion of an environment, such as the environment 100, and objects contained therein to detect the markers 200, 202. For example, the projector(s) may project infrared light towards the user 104 and the controller(s) 110, the markers 200, 202 may reflect the light, and the camera(s) and/or the sensors of the motion capture system(s) 102 may capture the reflected light. Therein, through analyzing the images, a position and/or orientation of the controller(s) 110 and/or the hand of the user 104 may be determined. For instance, the remote computing resource(s) 112 (or other computing devices) may analyze and parse images captured by the cameras and identify positions of the markers 200, 202 within the environment 100. The remote computing resource(s) 112 may determine, using the position of the markers 200, 202, gestures, hand positions, finger positions, and so forth made by the user 104 (i.e., which fingers are extended, curled, etc.). Additionally, the motion capture system(s) 102 (or other computing systems) may utilize information about a location/pattern of the markers 200, 202 to generate a skeletal model representing (e.g., animated 3D skeletal model) of the hand or gestures of the hand (e.g., clinched fist).

FIGS. 3-7 depict an example controller 300 (which may represent, and/or be similar to the controller 110 of FIGS. 1 and 2) according to an example embodiment of the present disclosure. In some instances, an electronic system such as a VR video gaming system, a robot, weapon, or medical device, may utilize the controller 300. The controller 300 may include a controller body 310 having a handle 312, and a hand retainer 320 to retain the controller 300 in the hand of a user (e.g. the user's left hand). In some instances, the handle 312 may comprise a substantially cylindrical tubular housing. In this context, a substantially cylindrical shape need not have a constant diameter, or a perfectly circular cross-section.

The controller body 310 may include a head (between the handle 312 and a distal end 311), which may optionally include one or more thumb-operated controls 314, 315, 316. For example, the head may include a tilting button, or any other button, knob, wheel, joystick, or trackball considered as a thumb-operated control conveniently manipulated by a thumb of a user during normal operation and while the controller 300 is held in the hand of the user.

In some instances, the controller 300 may include a tracking member 330 that is fixed to the controller body 310, and may include two noses 332, 334, each protruding from a corresponding one of two opposing distal ends of the tracking member 330. In some instances, the tracking member 330 may comprise a tracking arc having an arcuate shape. In some instances, the tracking member 330 may include a plurality of tracking transducers disposed therein/thereon (which may represent, and/or be similar to the markers 200, 202 of FIG. 2). In some instances, each protruding nose 332, 334 may include at least one tracking transducer. Additionally, or alternatively, the controller body 310 may include tracking transducers, with at least one distal tracking transducer disposed adjacent the distal end 311. The tracking transducers, which may include tracking sensors, may respond to electromagnetic radiation (e.g. infrared light) emitted by the motion capture system(s) 102. Additionally or alternatively, the tracking transducers may include tracking beacons that emit electromagnetic radiation (e.g. infrared light) that is received by cameras of the motion capture system(s) 102. For example, the projectors of the motion capture system(s) 102 may widely broadcast pulsed infrared light towards the controller 300. Here, the plurality of tracking transducers of the tracking member 330 may include infrared light sensors that receive or shadow from the broadcasted pulsed infrared light. In some instances, the tracking transducers in each nose 332, 334 (e.g., three sensors in each nose) may overhang the hand of the user on each distal end of the tracking member 330 for increased exposure (i.e., around the user's hand) and to receive electromagnetic radiation emitted by the projectors or to transmit the electromagnetic radiation to the cameras, at more angles without an unacceptable amount of shadowing.

A material of the tracking member 330 and/or the controller body 310 may include a substantially rigid material such as hard plastic, which are firmly fixed together to not appreciably translate or rotate relative to each other. For example, as shown in FIGS. 3-7, the tracking member 330 may couple to the controller body 310 at two locations. The hand retainer 320 may attach to the controller 300 (e.g., the controller body 310 and/or the tracking member 330) adjacent those two locations, to bias the palm of the user against the outside surface of the handle 312 between the two locations.

In certain embodiments, the tracking member 330 and the controller body 310 may comprise an integral monolithic component having material continuity, rather than being assembled together. For example, a single injection-molding process may mold the tracking member 330 and the controller body 310 together, resulting in one integral hard plastic component that comprises both the tracking member 330 and the controller body 310. Alternatively, the tracking member 330 and the controller body 310 may comprise separately fabricated parts that are later assembled together. In either instance, the tracking member 330 may affix to the controller body 310.

Figure 3:
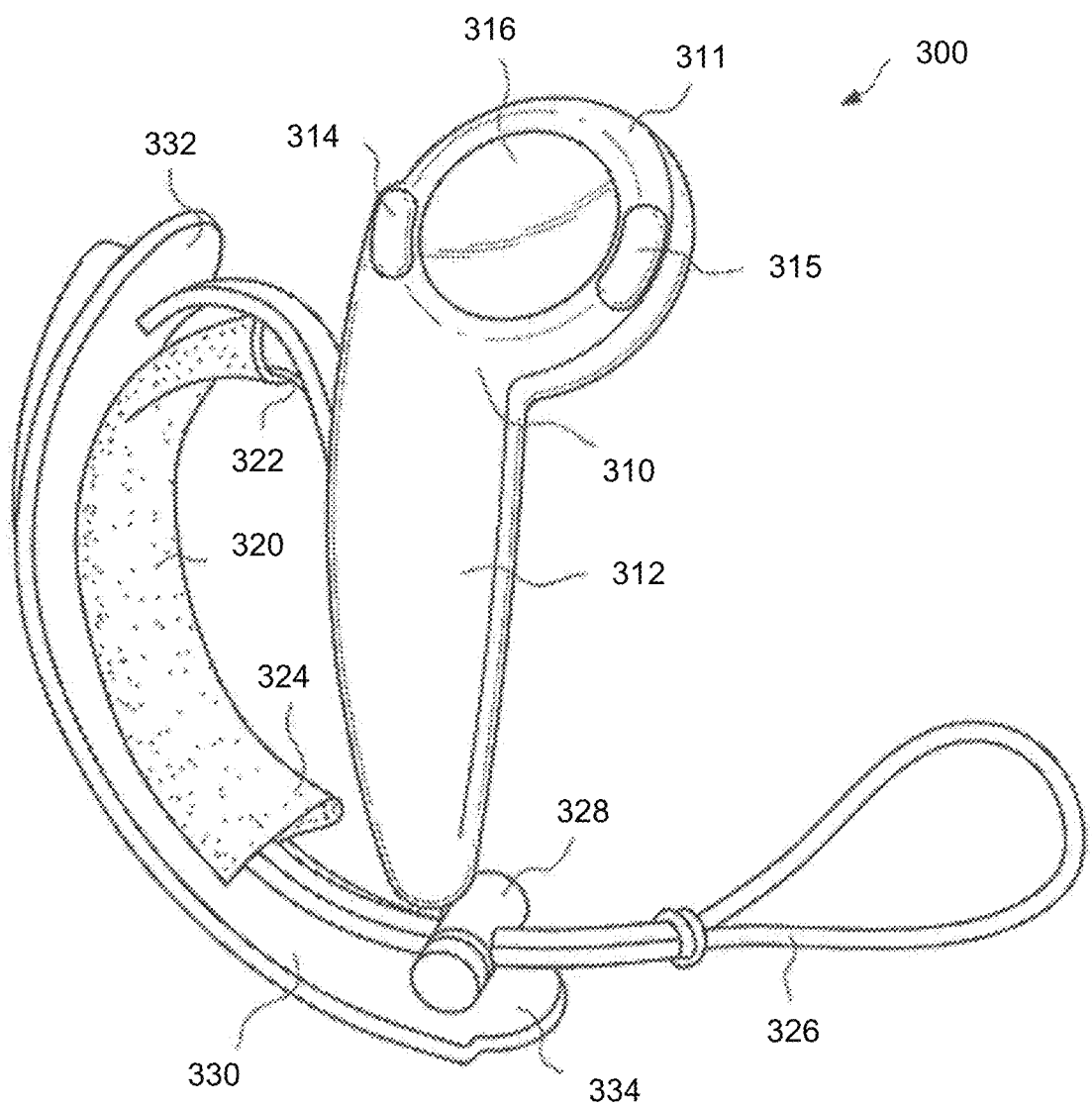
FIG. 3 depicts an example controller according to an example embodiment of the present disclosure.

The hand retainer 320 is shown in the open position in FIG. 3. The hand retainer 320 may optionally bias in the open position by a curved resilient member 322 to facilitate the insertion of the left hand of the user between the hand retainer 320 and the controller body 310 when the user grasps for the controller 300 with his or her vision blocked by a VR headset (e.g., VR headset 108). For example, the curved resilient member 322 may comprise a flexible metal strip that elastically bends, or may comprise an alternative plastic material, such as nylon that may bend substantially elastically. A cushion or fabric material 324 (e.g., a neoprene sheath) may partially or completely cover the curved resilient member 322 to provide the user comfort. Alternatively, the fabric material 324 may adhere to only the side of the curved resilient member 322, such as on a side that faces the hand of the user.

The hand retainer 320 may adjust in length, for example, by including a draw cord 326 that is cinched by a spring-biased chock 328. The draw cord 326 may have an excess length used as a lanyard. The cushion or fabric material 324 may couple to the draw cord 326. In certain embodiments, the tension of the cinched draw cord 326 may preload the curved resilient member 322. In such embodiments, the tension that the curved resilient member 322 imparts to the hand retainer 320 (to bias it in the open position) may cause the hand retainer 320 to automatically open when the draw cord 326 is un-cinched. Additionally, or alternatively, the length of a hand retainer 320 may adjust in other ways, such as a cleat, an elastic band (that temporarily stretches when the hand is inserted, so that it applies elastic tension to press against the back of the hand), a hook & loop strap attachment that allows length adjustment, etc.

Figure 4:
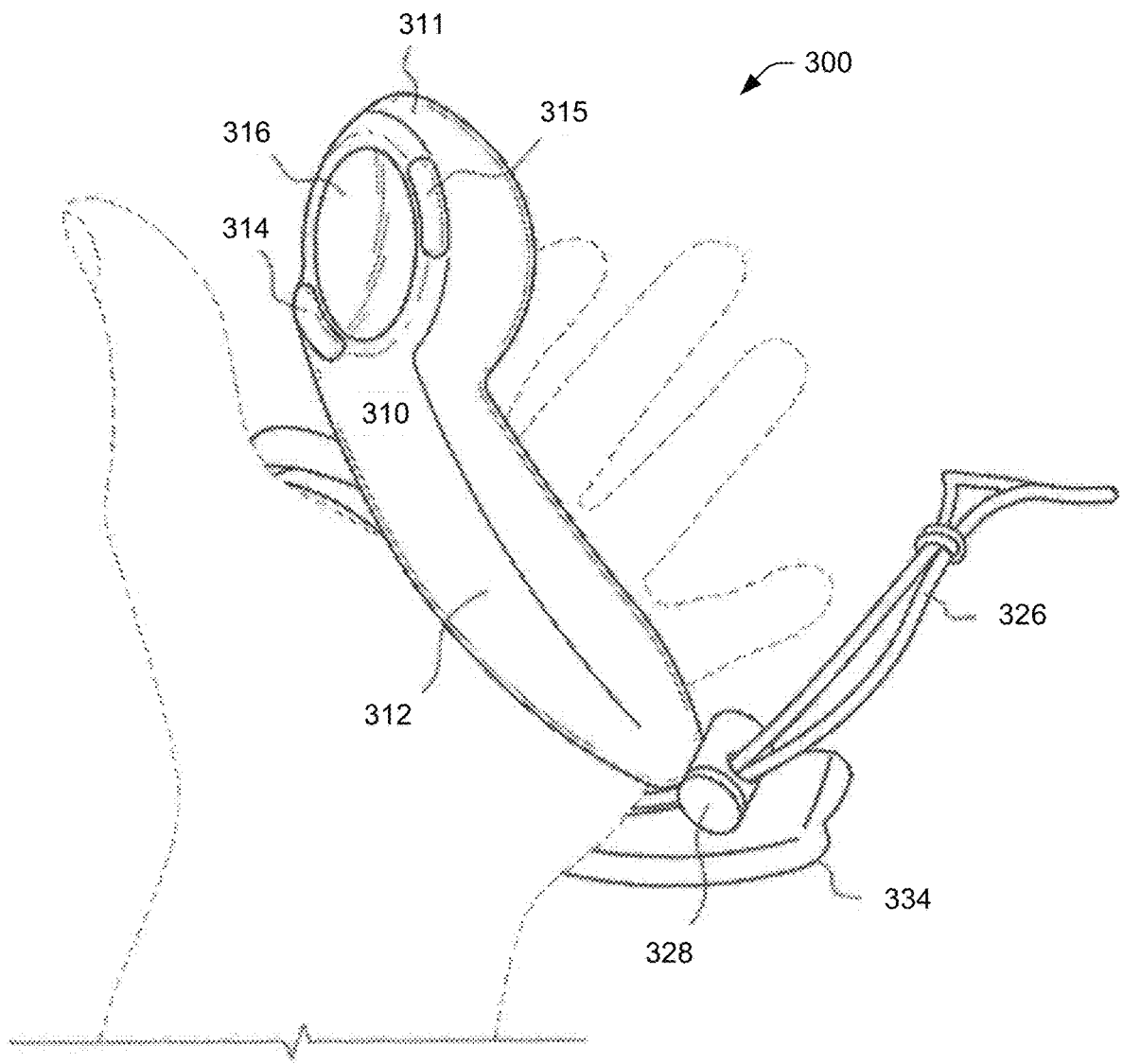
FIG. 4 depicts the example controller of FIG. 3 in a user's hand according to an example embodiment of the present disclosure.

The hand retainer 320 may dispose between the handle 312 and the tracking member 330, and contact the back of the user's hand. For instance, FIG. 4 shows the controller 300 during operation with the left hand of the user inserted therein but not grasping the controller body 310. In FIG. 4, the hand retainer 320 is closed and tightened over the hand to physically bias the palm of the user against the outside surface of the handle 312. When closed, the hand retainer 320 may retain the controller 300 within the hand of the user even in instances where the user is not grasping the controller body 310.

The handle 312 of the controller body 310 includes an array of proximity sensors that are spatially distributed partially or completely around its outer surface. In some instances, the proximity sensors of the array of proximity sensors are not necessarily of equal size and do not necessarily have equal spacing between them. In some instances, the array of proximity sensors may comprise a grid spatially distributed about the controller body 310. The array of proximity sensors is responsive to the proximity of the finger(s) of the user relative to the outside surface of the handle 312. For example, the array of proximity sensors may include an array of capacitive sensors embedded under the outer surface of the handle 312, where the outer surface comprises an electrically insulative material to sense touch from the user. The capacitance between the array of capacitive sensors and a portion of the hand of the user may be inversely related to the distance therebetween. To sense the capacitance, an RC oscillator circuit may connect to an element of the array of capacitive sensors and noting that the time constant of the RC oscillator circuit, and therefore the period and frequency of oscillation, will vary with the capacitance. In this way, the circuit may detect a release of finger(s) from the outer surface of the handle 312. Noted above, the array of proximity sensors may generate touch data (e.g., the touch data 124) in response to touch input from the user, where the touch data indicates the proximity of the finger(s) of the user relative to the outside surface of the handle 312.

The hand retainer 320, when tightly closed around the hand of the user, may prevent the controller 300 from falling out of hand and the fingers from excessively translating relative to the array of proximity sensors on the handle 312, thereby reliably sensing finger motion and position. Additionally, the motion capture system(s) 102 and/or the remote computing resource(s) 112 may include an algorithm embodying anatomically-possible motions of fingers to better use the touch data 124 from the array of proximity sensors to render the opening of a controlled character's hand, finger pointing, or other motions of fingers relative to the controller 300 or relative to each other (e.g., hand gestures). In this way, the user's movement of the controller 300 and/or fingers may help control a VR gaming system, defense system, medical system, industrial robot or machine, or another device. In VR system applications (e.g., for gaming, training, etc.), the system may render a throwing motion based on the movement of the tracking transducers, and may render the release of a thrown object based on sensing the release of the user's fingers (e.g., using the touch data 124) from the outer surface of the handle 312 of the controller 300.

The hand retainer 320 may therefore allow the user to "let go" of the controller 300 without the controller 300 actually separating from the hand, or being, thrown, and/or dropped to the floor, which may enable additional functionality of the controlled electronic system. For example, sensing a release and/or a restoration of the user's grasp of the handle 312 of the controller body 310 may indicate a corresponding throwing and/or grasping of objects within gameplay. The hand retainer 320 may therefore safely secure and retain the hand of the user during such animations. In some instances, the location of the hand retainer 320 in the embodiment of FIGS. 3-7 may help the tracking member 330 to protect back of user's hand from impacts in real world, for example, when the user moves in response to a prompt sensed in the VR environment (e.g., while practically blinded by the VR headset 108).

As will be discussed herein, the controller 300 may include a FSR to detect force values associated with touches from the user (e.g., the force data 126). The force data 126 may be utilized in conjunction with the touch data 124 to indicate movements and/or grips of the user with a VR environment.

In certain embodiments, the controller 300 may include a rechargeable battery disposed within the controller body 310 and/or the hand retainer 320 (e.g. hand retention strap) may include an electrically-conductive charging wire electrically coupled to the rechargeable battery. The controller 300 may also include a radio frequency (RF) transmitter for communication with the rest of the motion capture system(s) 102. The rechargeable battery may power the RF transmitter and may respond to the thumb-operated controls 314, 315, 316, the array of proximity sensors in the handle 312 of the controller body 310, and/or tracking sensors in the tracking member 330.

Figure 5:
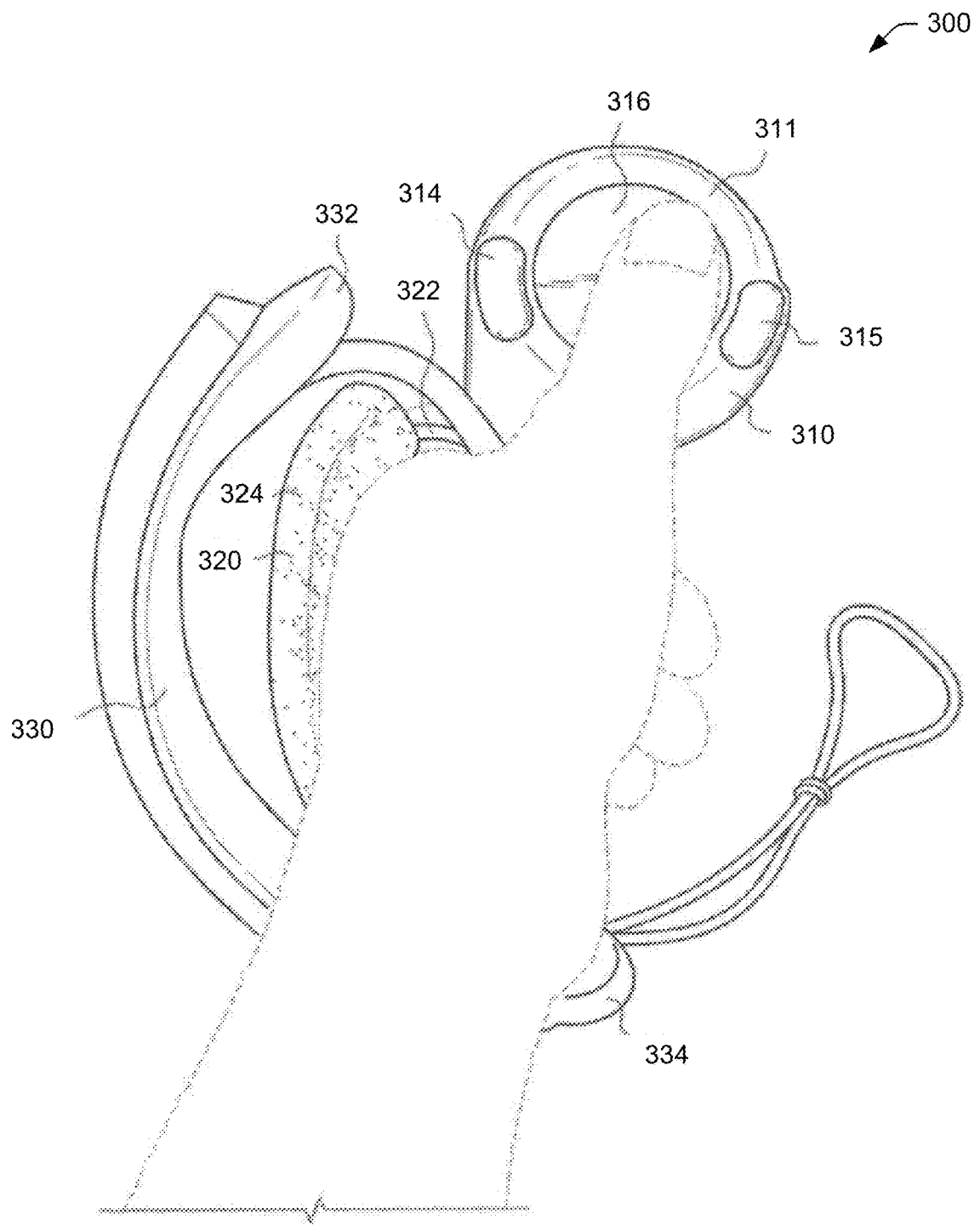
FIG. 5 depicts the example controller of FIG. 3 in a user's hand according to an example embodiment of the present disclosure.
Figure 6:
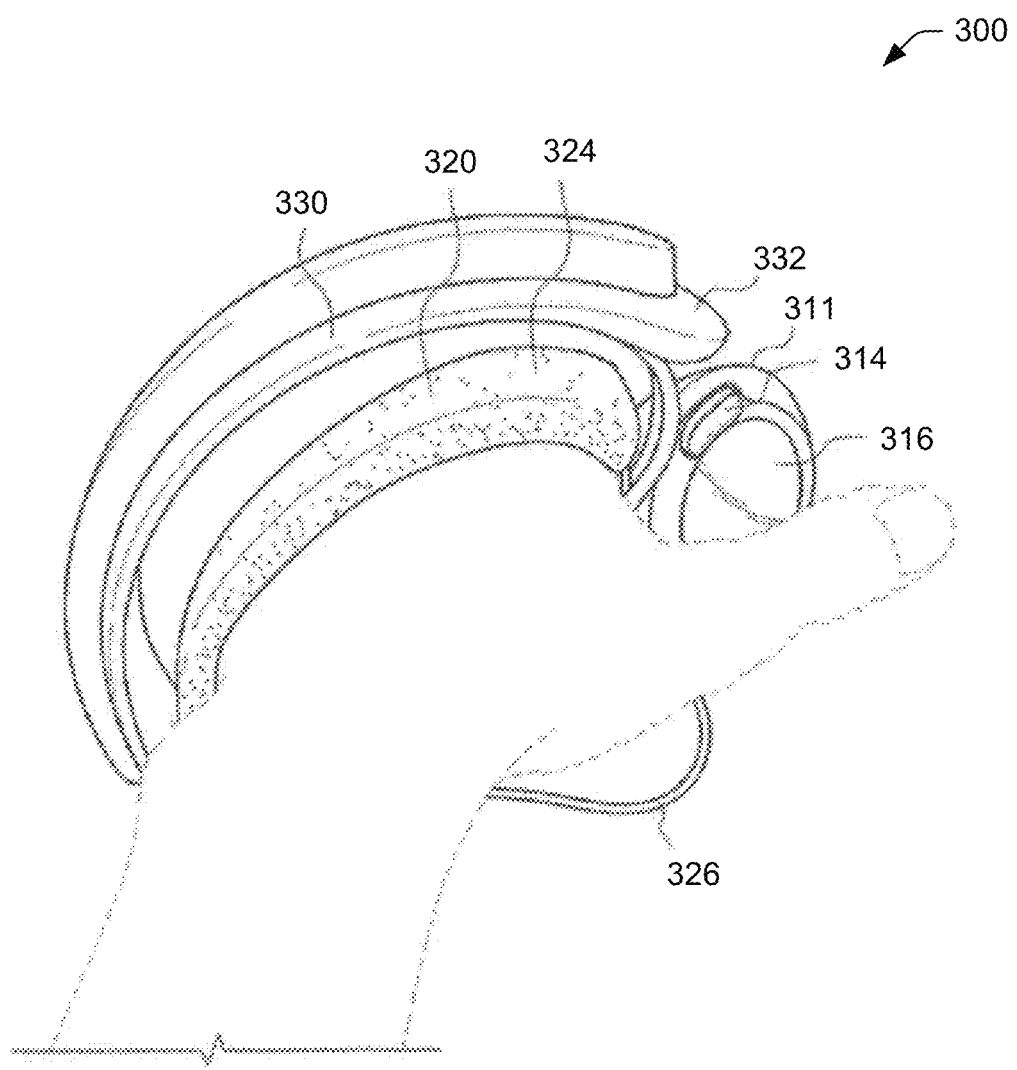
FIG. 6 depicts the example controller of FIG. 3 in a user's hand according to an example embodiment of the present disclosure.

FIGS. 5 and 6 depict the controller 300 during operation when the hand retainer 320 is closed and when the hand grasps the controller body 310. FIGS. 5 and 6 also illustrate that the thumb may operate one or more of the thumb-operated controls (e.g., the track pad 316).

Figure 7:
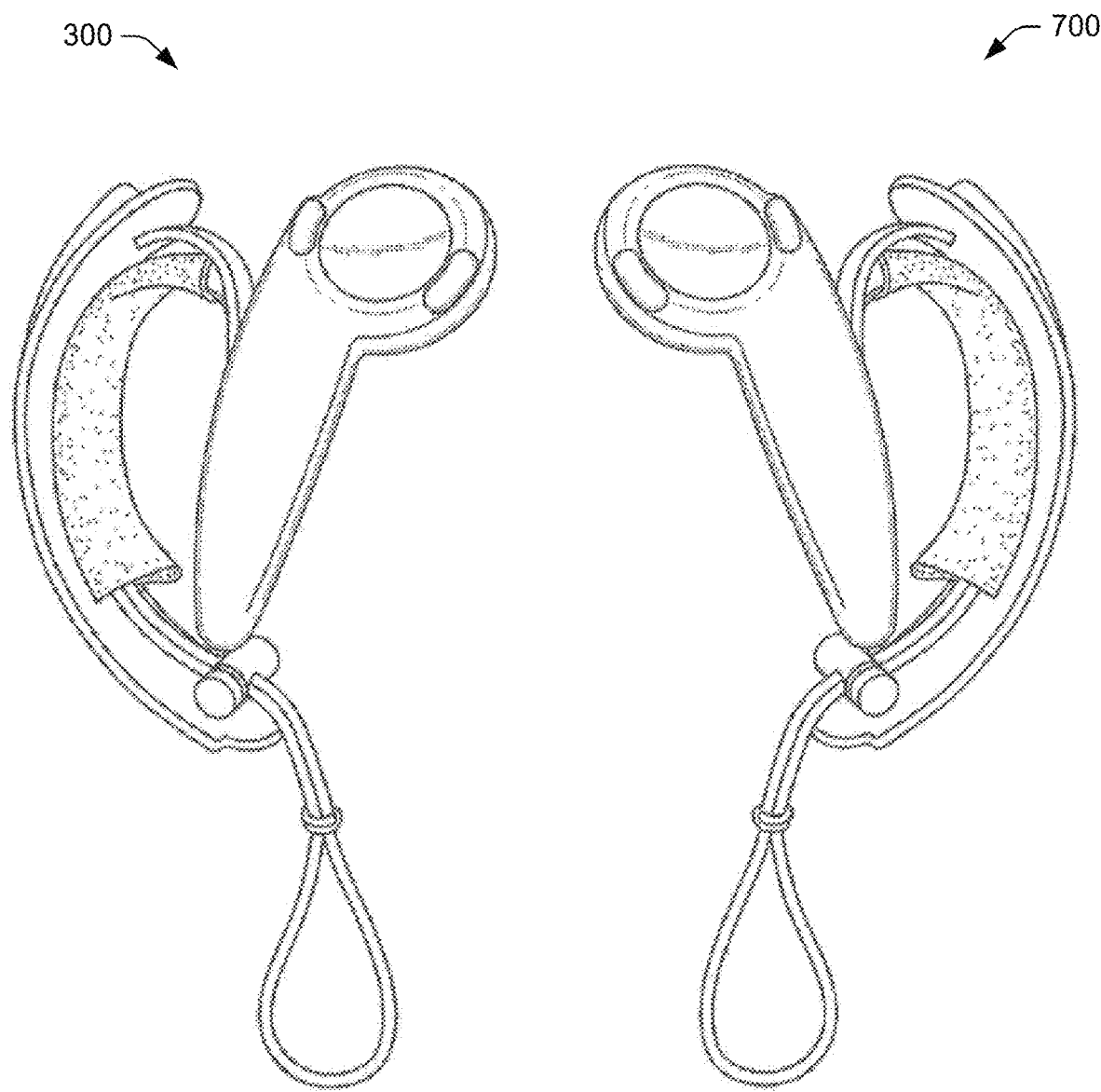
FIG. 7 depicts a pair of example controllers according to an example embodiment of the present disclosure.

FIG. 7 shows that in certain embodiments, the controller 300 may comprise a left controller in a pair of controllers that may include a similar right controller 700. In certain embodiments, the controllers 300, 700 may individually generate the touch data 124 and/or the force data 126 from the array of proximity sensors and the FSR, respectively, from both of a user's hands, simultaneously. Collectively, the remote computing resource(s) 112 may receive the motion data 122 (from the camera(s) of the motion capture system(s) 102) as well as the touch data 124 and/or the force data 126 (from the controllers 300, 700) to enhance a VR experience.

FIGS. 8A and 8B depict a front view of right-hand controller 800 a back view of the right-hand controller 800, respectively, according to another example embodiment of the present disclosure. In some instances, the right-hand controller 800 may include components discussed above with regard to the controller(s) 110 of FIG. 1 and/or the controller 300 of FIGS. 3-7.

The controller 800 may include a controller body comprising a head 810 and a handle 812. In the embodiment of FIGS. 8A and 8B, the head 810 may include at least one thumb-operated control A, B, 808, and may also include a control operable by the index finger (e.g., trigger 809). In some instances, the handle 812 may comprise a tubular housing that is partially wrapped by an outer shell 840.

The inner surface of the outer shell 840 may include a spatially distributed array of proximity sensors. The array of proximity sensors may respond to a proximity of the user's fingers relative to the outer shell 840. The proximity sensors of the array of proximity sensors are not necessarily of equal size, nor are they necessarily spaced regularly or equally from each other. In certain embodiments, the array of proximity sensors may be a plurality of capacitive sensors that may connect to a flex circuit bonded to the inner surface of the outer shell 840.

A tracking member 830 may affix to the controller body at the head 810 and at an end of the handle 812. A hand retainer 820 is configured to physically bias the user's palm against the outer shell 840, between the head 810 and the end of the handle 812. The hand retainer 820 is preferably disposed between the handle 812 and the tracking member 830, and may comprise a hand retention strap adjusts in length and contacts the back of the user's hand. In the embodiment of FIGS. 8A and 8B, the hand retainer 820 may include a draw cord 828 that may adjust in length by a cord lock 826 (adjacent a distal end of the handle 812) that selectively prevents sliding motion by the draw cord 828 at the location of the cord lock 826.

In the embodiment of FIGS. 8A and 8B, tracking transducers 832, 833 are disposed on the tracking member 830. In some instances, protruding noses at opposing distal ends of the tracking member 830 may include the tracking transducers 822, 833. In some instances, a distal region of the head 810 may include additional tracking transducers 834. The tracking transducers 832, 833, and 834 may include tracking sensors that respond to electromagnetic radiation (e.g., infrared light) emitted by the motion capture system(s) 102, or may include tracking beacons that emit electromagnetic radiation (e.g., infrared light) received by the motion capture system(s) 102. For example, the motion capture system(s) 102 may include projector(s) that widely broadcast pulsed infrared light towards the controller 800. Here, the plurality of tracking transducers 832, 833, and 834 may include infrared light sensors that receive the broadcasted pulsed infrared light. The motion capture system(s) 102 may receive the response of the tracking sensors and the motion capture system(s) 102 and/or the remote computing resource(s) 112 may interpret such response to effectively track the location and orientation of the controller 800.

A printed circuit board (PCB) may mount within the handle 812 and electrically connect components within the controller 800 (e.g., buttons, battery, etc.). The PCB may include a force sensing resistor (FSR) and the controller 800 may include a plunger that conveys a compressive force applied via the outer shell 840 towards the outside of the tubular housing of the handle inward to the FSR. In certain embodiments, the FSR, in conjunction with the array of proximity sensor, may facilitate sensing of both the onset of grasping by the user, and the relative strength of such grasping by the user, which may facilitate certain gameplay features.

Illustrative Force Sensing Resistor (FSR)

Figure 9A:
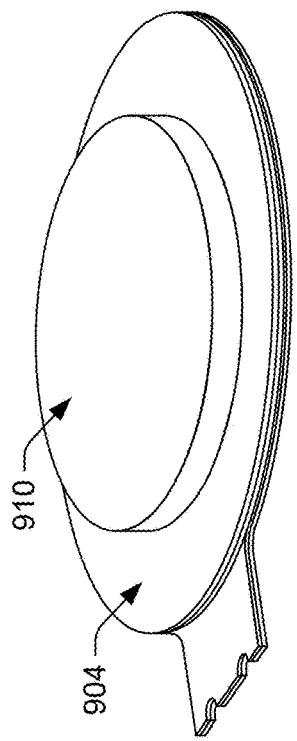
FIG. 9A depicts an example force sensing resistor (FSR) according to an example embodiment of the present disclosure.
Figure 9B:
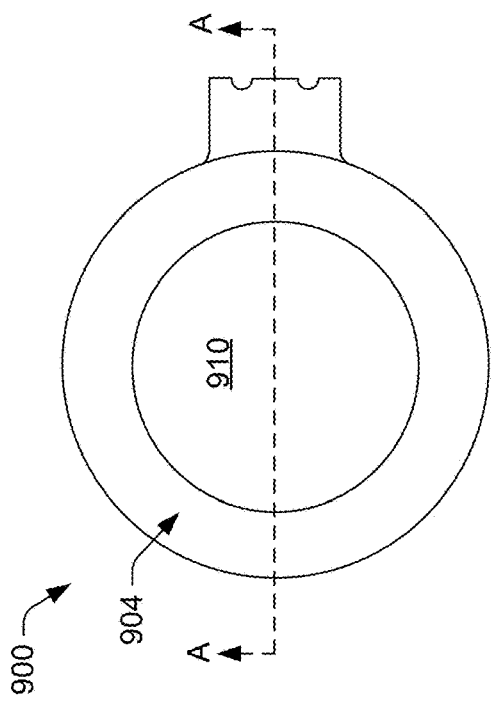
FIG. 9B depicts a front view of the example FSR of FIG. 9A.
Figure 9C:
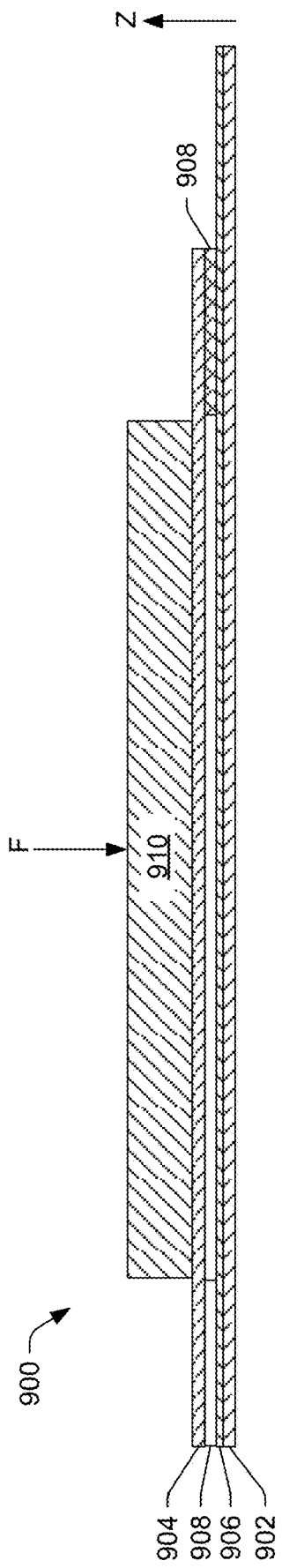
FIG. 9C depicts a cross section of the example FSR of FIG. 9B, taken along Section A-A of FIG. 9B.

FIGS. 9A-9C depict different views of a force sensing resistor (FSR) 900 according to an example embodiment of the present disclosure. As shown in the cross section of the FSR 900 in FIG. 9C, the FSR 900 may include a first substrate 902, which in some instances may include polyimide. The FSR 900 may further include a second substrate 904 disposed on (or over) the first substrate 902. The first substrate 902 and the second substrate 904 may comprise the two primary substrates (or layers) of the FSR 900 (i.e., a 2-layer FSR 900). However, it is to be appreciated that the FSR 900 may include additional layers. In some instances, the first substrate 902 may represent a "bottom" or "base" substrate with respect to the two primary substrates of the FSR 900, however, in some instances, there may be layers of material behind (or below) the first substrate 902 (i.e., in the negative Z direction, as depicted in FIG. 9C).

The first substrate 902 includes a conductive material disposed on a front surface (i.e., the surface facing in the positive Z direction) of the first substrate 902. The conductive material may include a plurality of interdigitated metal fingers. Meanwhile, the second substrate 904 (sometimes referred to as a resistive "membrane") may include a resistive material disposed on a back surface (i.e., the surface facing the negative Z direction) of the second substrate 904. This resistive material may include a semiconductive material, such as an ink composition (e.g., silver ink, carbon ink, mixtures thereof, etc.), that exhibits some level of electrical resistance (e.g., a relatively high sheet resistance within a range of 300 kiloOhm (kOhm) per square (kOhm/sq) to 400 kOhm/sq). In some instances, the sheet resistance of the second substrate 904 is 350 kOhm/sq. However, the second substrate 904 may include other sheet resistance values, including those outside of the sheet resistance ranges specified herein, such as when the FSR 900 is used in other applications (e.g., non-controller based applications). In some embodiments, a material of the second substrate 904 may include mylar, with the resistive material disposed on a back surface of the second substrate 904. In some embodiments, the second substrate 904 may include made of polyimide having a resistive material (e.g., a conductive ink composition) on the back surface. Using polyimide for the second substrate 904 may allow for mass manufacturing of the FSR 900 using a reflow oven, whereas mylar may not withstand such high temperatures.

The FSR 900 may include one or more spacer layers interposed between the first substrate 902 and the second substrate 904 so that a center portion of the second substrate 904 may suspend over the first substrate 902 and spaced a distance therefrom. FIG. 9C shows two spacer layers including, without limitation, a coverlay 906 disposed on the first substrate 902 at a periphery of the first substrate 902, and a layer of adhesive 908 disposed on the coverlay 906. A material of the coverlay 906 may include polyimide, and may thus include the same material as the first substrate 902. A thickness (as measured in the Z direction) of the coverlay 906 may range from 10 microns to 15 microns. A thickness (as measured in the Z direction) of the layer of adhesive 908 may range from 50 microns to 130 microns. The total distance at which the second substrate 904 is spaced from the first substrate 902 may, therefore, be the sum of the thicknesses of the one or more spacer layers (e.g., the thickness of the coverlay 906 plus the thickness of the layer of adhesive 908). These layers may include thicknesses that are outside of the thickness ranges specified herein, such as when the FSR 900 is used in other applications, such as non-controller based applications. As such, these thickness ranges are to be understood as non-limiting. Additionally, in some instances, the thickness of the layer of adhesive 908 is made as thin as possible (e.g., at the lower end of the specified thickness range) to allow for an initial response (e.g., the FSR 900 starts detecting an input) under a very light applied force, F. The adhesives, both materials and a thickness thereof, may vary to increase or decrease a stiffness of the FSR 900.

The substrate 904 may include an actuator 910 (such as a disk-shaped, compliant plunger) configured to convey a force, F, onto a front surface of the second substrate 904. A material of the actuator 910 may include Poron, which is a compliant material that deforms to a degree upon application of a force upon the actuator 910. The actuator 910 may be concentric with a center of an active area of the FSR 900 in order to center the applied force, F. The actuator 910 may also span a portion of the active area of the FSR 900 to evenly distribute the applied force, F, across that portion of the active area of the FSR 900.

A thickness (as measured in the Z direction) of the second substrate 904 may include a range of 50 microns to 130 microns. At this example thickness, the second substrate 904 is flexible. For example, a material of the second substrate 904 may include mylar, which is flexible at a thickness within the above-specified range. Functional operation of the FSR 900 relies on the flexibility of the second substrate 904 in order for the resistive material on the back surface of the second substrate 904 to come into contact with the conductive material on the front surface of the first substrate 902 under a compressive force, F, applied to the actuator 910. A thickness (as measured in the Z direction) of the first substrate 902 may include a range of 20 microns to 30 microns. Polyimide, at this thickness, is also flexible. Thus, the first substrate 902 is also flexible. Meanwhile, a thickness (as measured in the Z direction) of the actuator 910 may range from 780 microns to 810 microns. These layers may include thicknesses that are outside of the thickness ranges specified herein, such as when the FSR 900 is used in other applications (e.g., non-controller based applications). As such, these thickness ranges are to be understood as non-limiting.

The FSR 900 may exhibit varying resistance in response to a variable force, F, applied to the actuator 910. For example, as the applied force, F, on the actuator 910 increases, the resistance may decrease. In this manner, the FSR 900 may represent as a variable resistor whose value is controlled by the applied force, F. The FSR 900 may include a "ShuntMode" FSR 900 or a "ThruMode" FSR 900. With a ShuntMode FSR 900, the conductive material disposed on the front surface of the first substrate 902 may include a plurality of interdigitated metal fingers. When the applied force, F, is applied to the front (or top) of the actuator 910, the resistive material on the back surface of the second substrate 904 may come into contact with some of the interdigitated metal fingers, which shunts the interdigitated metal fingers, thereby varying the resistance across the output terminals of the FSR 900. An example conductive for the interdigitated metal fingers may include copper, such as HA copper or RA copper. The interdigitated metal fingers may also include gold plating.

A subtractive manufacturing process may form the plurality of interdigitated metal fingers. A finger width and spacing between interdigitated metal fingers may provide an optimal balance between maximum sensitivity of the FSR 900 and minimize manufacturing etch tolerance. In some instances, the interdigitated metal fingers may include a uniform pattern or non-uniform patterns (e.g., denser fingers toward a center and less dense fingers toward the outside). Additionally, in some instances, there may be no additional copper plating over the base layer copper prior to gold plating as adding additional copper plating over the base layer copper prior to gold-plating may cause an undesirable increase of detected resistance. Thus, in some instances, the omission of any additional copper plating on the interdigitated metal fingers prior to the gold plating may achieve optimal sensitivity in the FSR 900.

In a ThruMode implementation, the conductive material on the first substrate 902 may include a solid area of conductive material with a semiconductive (or resistive) material disposed on the conductive material. The second substrate 904 may have a similar construction (e.g., a solid area of conductive material having a semiconductive (or resistive) material disposed thereon). The solid area of conductive material on each substrate (902 and 904) may couple to an individual output terminal and excitation current may pass through one layer to the other when the two substrates (902 and 904) come into contact under an applied force, F.

With these implementations, the FSR 900 may exhibit less hysteresis and higher repeatability (from one FSR 900 to another FSR 900), as compared to conventional FSRs, such as those that use mylar as the material for the bottom substrate. Loading hysteresis describes the effect of previously applied forces on the current FSR 900 resistance. The response curve is also monotonic and models true analog input that may be leveraged for a number of game mechanics in a VR gaming system, such as to crush a virtual rock, squeeze a virtual balloon, etc. However, although examples herein describe an applied force, F, the FSR 900 is, in actuality, sensitive to applied pressure (force×area) because equal amounts of force applied at a small point verses a larger area on front surface of the second substrate 904 may result in a different resistance response of the FSR 900. Thus, the actuator 910 may play a role in maintaining repeatability across FSRs 900 in terms of the response curves under the applied force, F.

The FSR 900 may include an open-circuit under no external force (or load). In some embodiments, to account for any contact of the first substrate 902 and the second substrate 904 under zero or negligible applied force, a threshold circuit may set a threshold resistance value at which the first substrate 902 and the second substrate 904 are considered to be "in contact," meaning that the FSR 900 may represent an open-circuit until the threshold resistance value is met, even if the two primary substrates (i.e., 902 and 904) are actually in contact.

The FSR 900 may mount on a planar surface of a structure within a handheld controller, such as the controller 110, 300, and 800 disclosed herein. The FSR 900 may mount at any suitable location within the controller body to measure a resistance value that corresponds to an amount of force associated with touch inputs of the user applied to an outer surface of the controller body (e.g., a force applied by a finger pressing upon a control, a force applied by a hand squeezing the handle of the controller). The FSR 900 may mount on a planar surface of the PCB, which itself may mount within the tubular housing of the handle. In this configuration, the plunger may interface with the actuator 910 of the FSR 900, which may allow for conveying a compressive force from the plunger to the actuator 910. Other configurations are possible, however, where the plunger is omitted, and the actuator 910 may interface with a portion of the tubular housing of the handle.

Additionally, or alternatively, the FSR 900 may mount on a planar surface of a structure within a head (between the handle and a distal end). The structure may mount within the head underneath one or more of the thumb-operated controls. For example, the FSR 900 may mount underneath the thumb-operated control (e.g., a track pad). Accordingly, when a user's thumb presses upon the thumb-operated control during operation while the controller, the FSR 900 positioned underneath the thumb-operated control may measure a resistance value that corresponds to an amount of force applied to the thumb-operated control by the user's thumb. In some instances, the controller may include multiple FSRs 900 disposed within the controller body, such as one or more FSRs 900 mounted within the handle and/or one or more FSRs 900 mounted underneath one or more corresponding controls on the head of the controller body.

The FSR 900 may enable variable analog inputs when implemented in a controller. For instance, squeezing the handle or pressing upon the thumb-operated control(s) with varying amounts of force may cause a resistance of the FSR 900 to vary with the applied force, F. The resistance may be converted into a varying digitized value that represents the FSR input for controlling game mechanics (e.g., picking up and throwing objects).

The FSR 900 may utilize different touches or touch styles. For instance, a "Simple Threshold" style may mean that a FSR input event occurs when the digitized FSR input value meets or exceeds a threshold value. Because the digitized FSR input value corresponds to a particular resistance value measured by the FSR 900, which, in turn, corresponds to a particular amount of force applied to the FSR 900, one can also think of this style of "Soft Press" as registering a FSR input event when the resistance value measured by the FSR 900 meets a threshold resistance value, and/or when the applied force F meets a threshold amount of force. For example, if the handle of the controller (e.g., the controller 110, 300, and/or 800) includes the FSR 900, the handle may be squeezed until a threshold amount of force is reached, and, in response, the FSR 900 input event is registered as a "Soft Press." The force required to "unpress" may be a fraction of the threshold value for debounce purposes and/or to mimic a tact switch with a physical snap ratio. A "Hair Trigger" style may set a baseline threshold value, and once a digitized FSR input value associated with the FSR 900 meets or exceeds the baseline threshold value, the binding is activated (i.e., a FSR input event is registered, akin to a press-and-hold button actuation). Thereafter, any subsequent decrease in force deactivates the binding (i.e., the FSR input event is "unregistered," akin to a user letting go of a button), and any increase in force after deactivating the binding operates to activate the binding again. A "Hip Fire" style may be similar to the "Simple Threshold" style of Soft Press, except that the "Hip Fire" style utilizes a time delay so that, in a configuration with multiple levels of bindings, the time delay can be used to ignore lower FSR input values if a higher threshold value is reached quickly enough. The amount of time delay varies between the different sub-styles (e.g., Aggressive, Normal, and Relaxed).

In some instances, an additional Soft Press Threshold may include a multi-level threshold, such as the thresholds for the "Hip Fire" style of Soft Press. The different styles of Soft Press for FSR-based input may enable a number of different game-related, analog inputs by virtue of the user squeezing or pressing a FSR-based input mechanism with varying force. For example, a VR game may allow a user to crush a rock or squeeze a balloon by squeezing the handle of the controller body with increasing force. As another example, a shooting-based game may allow the user to toggle between different types of weapons by pressing a thumb-operated control with different levels of applied force.

In some instances, the user may adjust the thresholds to reduce hand fatigue relating to actuation of the FSR-based input mechanism. In some instances, the threshold may include a default threshold value for a particular game (e.g., a lower default threshold value for a shooting game, a higher default threshold value for an exploration game, etc.).

Illustrative Hand Gestures

FIGS. 10A-10F illustrate different variations of a user 1000 holding a controller 1002 (which may represent, and/or be similar to the controller 110 of FIGS. 1 and 2, the controller 300 of FIGS. 3-7, and/or the controller 800 of FIG. 8). Generally, and in line with the above disclosure, through sensing location and force of a touch input of the user 1000 on the controller 1002 (e.g., using the array of the proximity sensors and/or the FSR 900), the remote computing resource(s) 112 may generate an animation (e.g., the animation 128) for display on the VR headset 108. The animation may resemble the hand gestures depicted in FIGS. 10A-10F, respectively. That is, using previously trained model(s) 120, the remote computing resource(s) 112 may generate images of the hand based on the touch data 124 and/or force data 126 received from the controller(s) 1002.

Figure 10A:
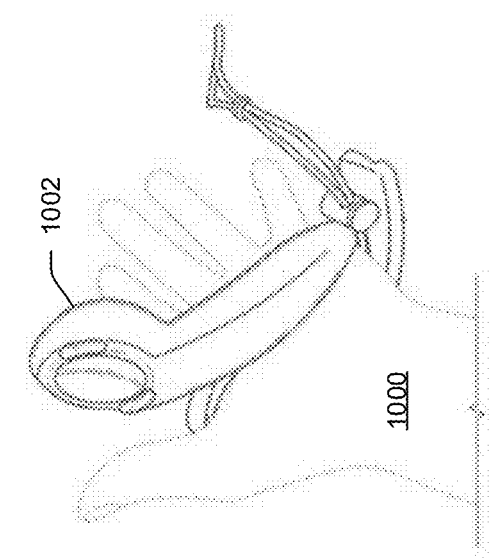
FIG. 10A depicts a first hand gesture of a user holding an example controller according to an example embodiment of the present disclosure.

Beginning with FIG. 10A, the user 1000 is shown holding the controller 1002 with an open grip. The fingers and the thumb of the user 1000 are not contacting the controller 1002 but instead, the controller 1002 may contact the palm of the user 1000. The controller 1002 may detect this contact, generate the touch data 124 and/or the force data 126, and transmit the touch data 124 and/or the force data 126 to the remote computing resource(s) 112. Here, the touch data 124 may represent or indicate the palm of the user 1000 touches the controller 1002. As the user 1000 does not grip the controller 1002 in FIG. 10A with his or her fingers, the force data 126 may indicate a level of force the palm of the user 1000 is biased against the controller 1002. In some instances, because the user 1000 does not grip the controller 1002, the controller 1002 may only generate the touch data 124 indicative of the proximity of the finger(s) of the user relative to the outside surface of the handle 312.

The remote computing resource(s) may input the touch data 124 and/or the force data 126 into the model(s) 120 which may generate hand image data (e.g., the animation 128) corresponding to an open hand gesture. In some instances, the remote computing resource(s) 112 may select specified model(s) 120 for inputting the touch data 124 and/or the force data 126. In some instances, in gameplay, an open hand gesture may represent picking up an object, dropping an object, and so forth.

Figure 10B:
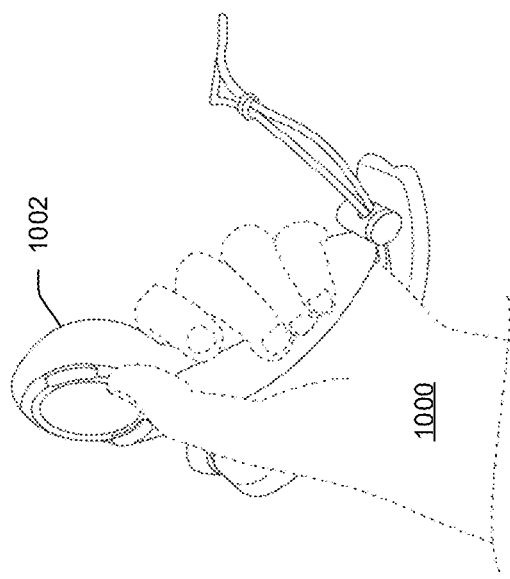
FIG. 10B depicts a second hand gesture of a user holding an example controller according to an example embodiment of the present disclosure.

FIG. 10B illustrates the user 1000 holding the controller 1002 with all four fingers and the thumb. Here, the touch data 124 generated by the array of proximity sensors of the controller 1002 may indicate the grasp of the user 1000. The force data 126 generated by the FSR (e.g., the FSR 900) may indicate the force in which the user 1000 grasps the controller 1002. The controller 1002 may transmit the touch data 124 and/or the force data 126 to the remote computing resource(s) 112 where the remote computing resource(s) 112 may select the model(s) 120 corresponding to the touch data 124 and/or the force data 126. The animation 128 corresponding to the model(s) 120 may generate a hand gesture that represents a closed first gesture, a grabbing gesture, and so forth.

Figure 10C:
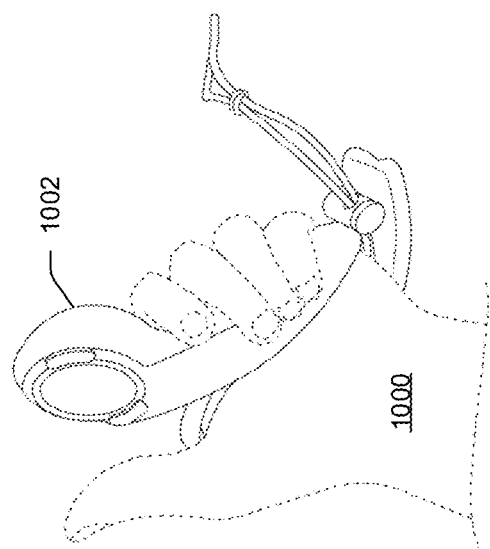
FIG. 10C depicts a third hand gesture of a user holding an example controller according to an example embodiment of the present disclosure.

FIG. 10C illustrates the user 1000 holding the controller 1002 with all four fingers but not the thumb. In this example, the remote computing resource(s) 112 may utilize the touch data 124 and/or the force data 126 to determine associated model(s) 120, where the model(s) 120 indicate that the user 1000 holds an object with all four fingers but not the thumb. The model(s) 120 may generate the animation 128 for display on the VR headset 108 representing this configuration of touch on the controller 1002 (e.g., thumbs up, trigger actuator, etc.).

Figure 10F:
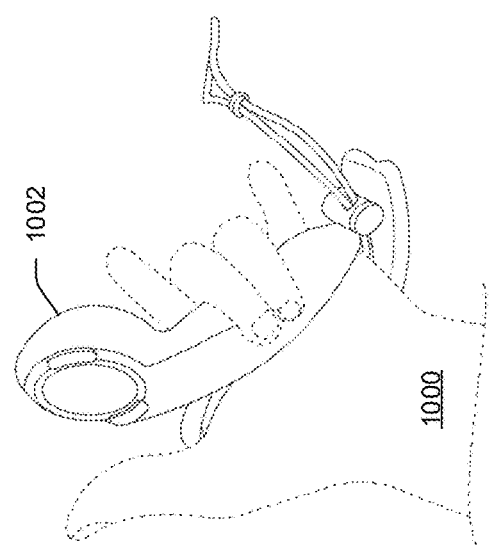
FIG. 10F depicts a sixth hand gesture of a user holding an example controller according to an example embodiment of the present disclosure.
Figure 10E:
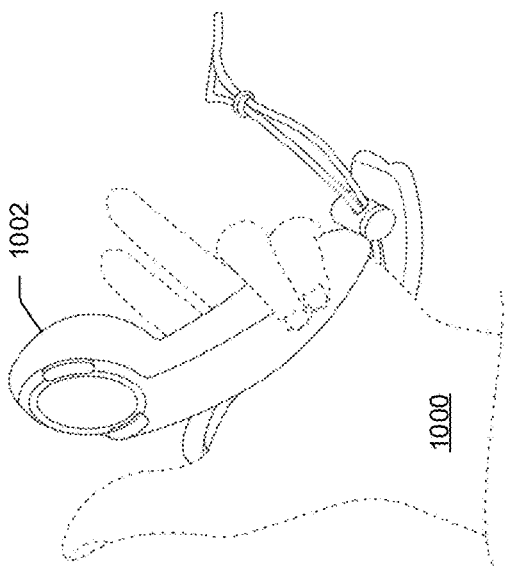
FIG. 10E depicts a fifth hand gesture of a user holding an example controller according to an example embodiment of the present disclosure.
Figure 10D:
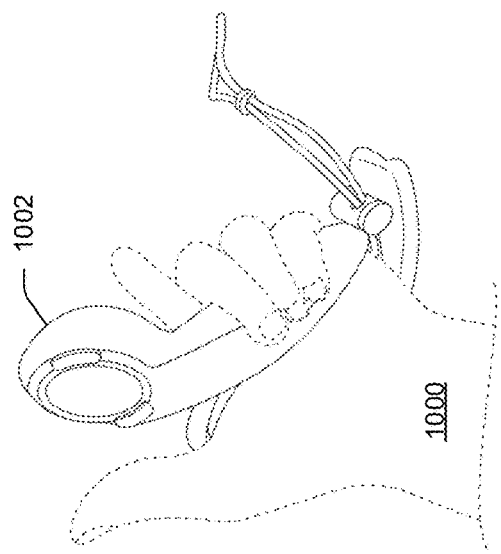
FIG. 10D depicts a fourth hand gesture of a user holding an example controller according to an example embodiment of the present disclosure.

FIG. 10D illustrates the user 1000 holding the controller 1002 with the middle finger and the ring finger. Here, the touch data 124 may indicate the touch of the middle finger and the ring finger. The touch data 124 may also indicate the proximity of the index finger and the pinky finger (which to do not contact the controller 1002) relative to the outside surface of the handle of the controller 1002. The force data 126 may indicate the force values associated with the grip of the middle finger and/or the ring finger of the user 1000. The model(s) 120 may generate an associated animation 128 according to the touches of the middle finger and ring finger as well as their associated force values.

FIG. 10E illustrates the user 1000 holding the controller 1002 with the ring finger and the pinky finger. The remote computing resource(s) 112 may utilize the touch data 124 associated with the touch of the ring finger and the pinky finger and/or a lack of touch of the index finger and/or the middle finger, to select associated model(s) 120, a corresponding animation 128, and generate a hand gesture for display on the VR headset 108. The remote computing resource(s) 112 may also utilize force data 126 generated from the FSR in selecting model(s) 120 and generating the hand gesture.

FIG. 10F illustrates the user holding the controller 1002 with the index finger, the middle finger, and the pinky finger. The remote computing resource(s) 112 utilize the touch data 124 and/or the force data 126 to generate an associated hand gesture on the VR headset 108, such as the user 1000 firing a weapon.

Although FIGS. 10A-10F illustrate particular combinations of the fingers and thumb of the user 1000 touching the controller 1002 to generate an associated hand gesture, other combinations are possible. In such situations, the controller 1002 may detect the location associated with the touch input, using the array of proximity sensors, as well as a force associated with the touch input of the user 1000, using the FSR 900. The controller 1002 may transmit the touch data 124 and/or the force data 126 to the remote computing resource(s) 112, where the remote computing resource(s) 112 may select the model(s) 120 corresponding to the touch data 124 and/or the force data 126. Noted above, the model(s) 120 are previously trained and/or generated utilizing previous motion data 122, the touch data 124, and/or the force data 126. Accordingly, at a later instance, through receiving the touch data 124 and/or the force data 126, the remote computing resource(s) 112 may associate the touch data 124 and/or the force data 126 with one or more model(s) 120. As the model(s) 120 are associated with an animation 128, the remote computing resource(s) 112 may select one or more model(s) 120, generate a corresponding animation 128, and transmit the animation 128 to the VR headset 108 for display.

Illustrative Processes

Figure 11:
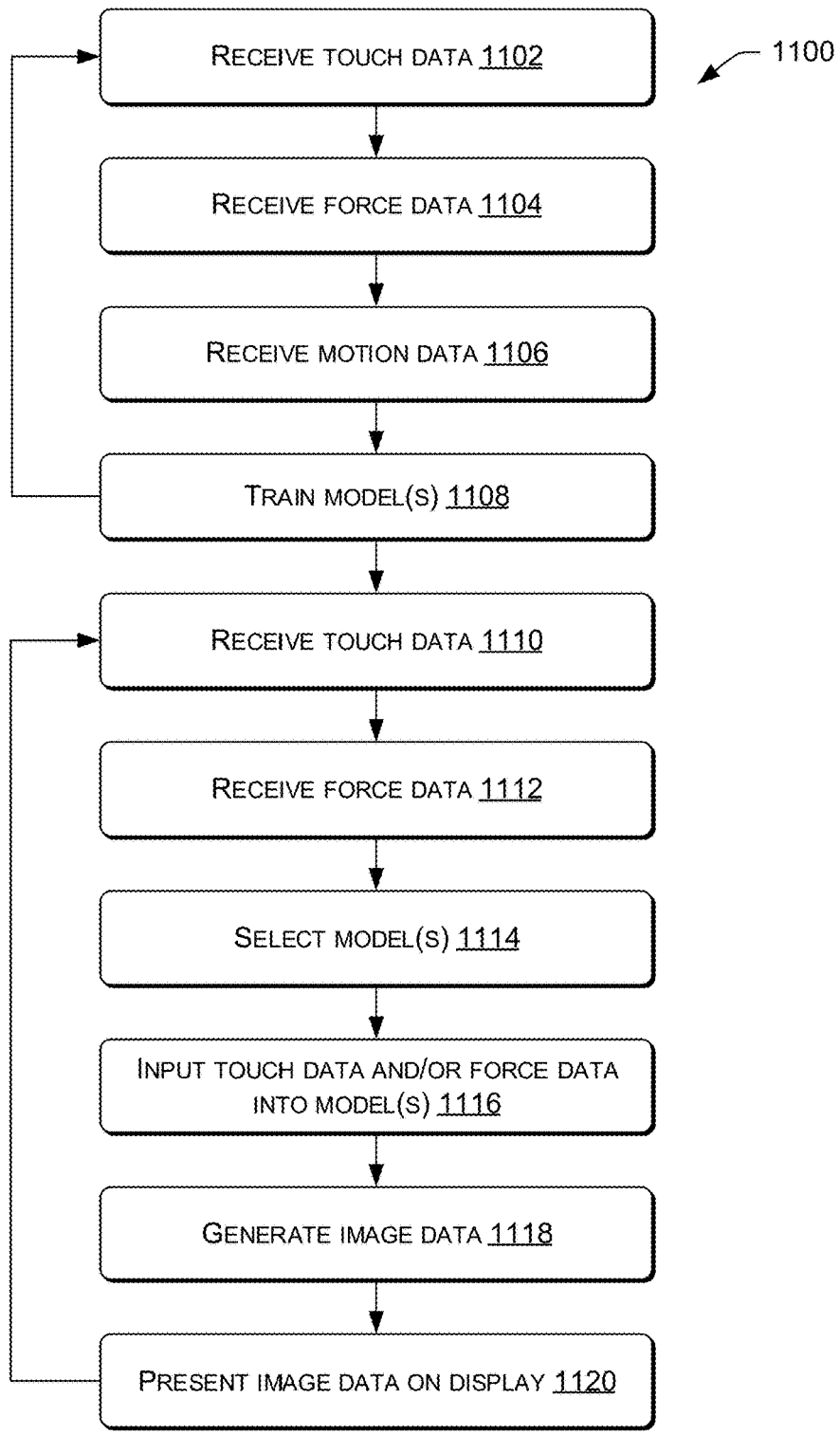
FIG. 11 depicts an example process according to an example embodiment of the present disclosure.
Figure 12:
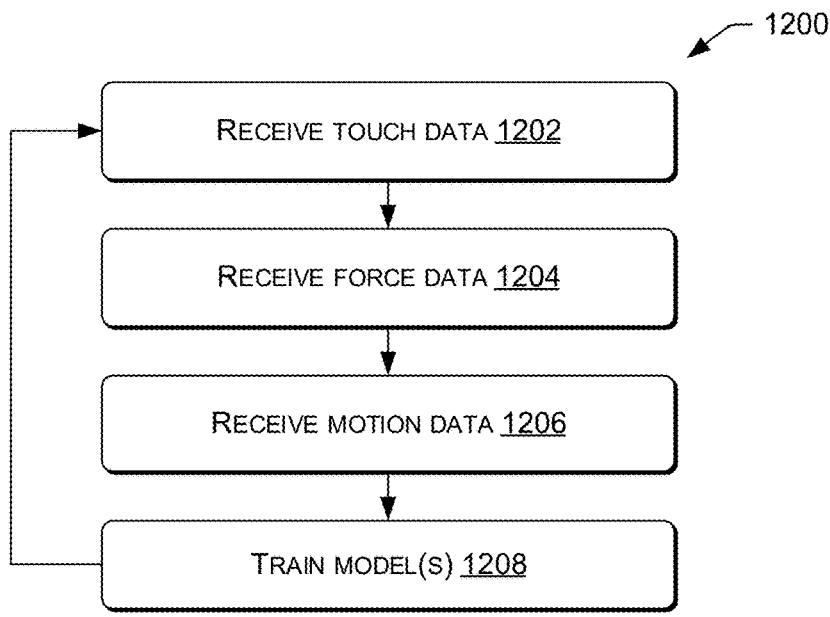
FIG. 12 depicts an example process for training model(s) according to an example embodiment of the present disclosure.
Figure 13:
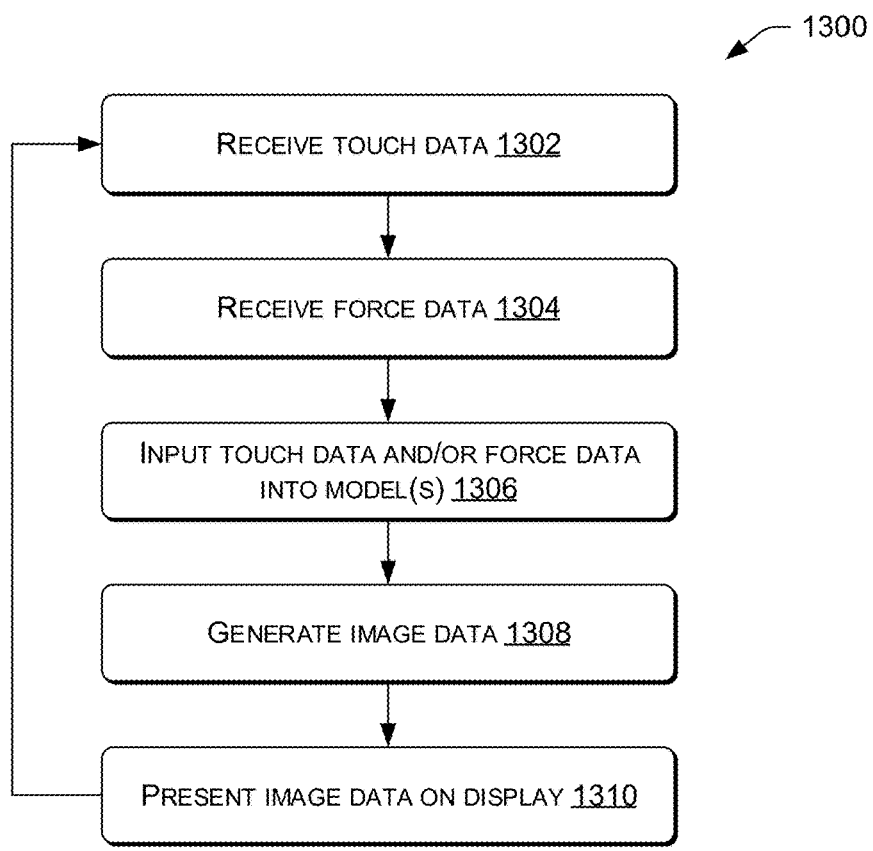
FIG. 13 depicts an example process for using touch input to generate gestures according to an example embodiment of the present disclosure.

FIGS. 11-13 illustrate various processes according to the embodiments of the instant application. The processes described herein are illustrated as collections of blocks in logical flow diagrams, which represent a sequence of operations, some or all of which may be implemented in hardware, software, or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed. For discussion purposes, the processes are described with reference to the environments, architectures and systems described in the examples herein, such as, for example those described with respect to FIGS. 1-10, although the processes may be implemented in a wide variety of other environments, architectures and systems.

Beginning with FIG. 11, at block 1102, the process 1100 may receive touch data corresponding to a touch input at a controller. The touch data may represent location(s) on the controller where the touch input was received and/or the proximity of the finger(s) of the user relative to the controller (e.g., capacitance values from an array of proximity sensors or capacitive sensors).

At block 1104, the process 1100 may receive force data corresponding to the touch input at the controller. The force data may represent an amount of force associated with the touch input at the controller. In some instances, the force data may be received when the force values are over a certain force threshold.

At block 1106, the process 1100 may receive motion data corresponding to a movement of a user operating the controller. The motion data may represent movements of a user, such as a movement of the user's finger(s) and wrist(s). The motion data may also represent a motion of the controller.

At block 1108, the process 1100 may train model(s) using the touch data, the force data, and/or the motion data. For instance, to train the model(s), the process 1100 may associate the touch data, the force data, and/or the motion data to correspond movements of the user, as represented by the motion data. That is, using the touch data, the force data, and/or the motion data, the process 1100 may train model(s) to learn characteristics of the touch of the user and associate these characteristics with certain hand gestures, as determined from the motion data. In some instances, the characteristics may include a location and a force of the touch input(s) on the controller. In some instances, the touch data, the force data, and/or the motion data may be associated utilizing time stamps corresponding to when the touch data, the force data, and/or the motion data was captured, respectively. Through overlaying the touch data, the force data, and/or the motion data on a time scale, the process 1100 may correlate the touch data and/or the force data with the motion data and identify hand gesture(s) of the user. In training the model(s), at later instances, the process 1100 may receive the touch data and/or the force data and determine an associated gesture (without receiving motion data).

From block 1108, the process 1100 may loop to block 1102 to receive additional touch data, additional force data (e.g., block 1104), and/or additional motion data (e.g., block 1106). This additional data may be utilized to further train the model(s), which may allow for a more accurate hand gesture determination based on the touch data and/or the force data received at later instances (e.g., during gameplay). That is, the process 1100 may continue to correlate the touch data, the force data, and/or the motion data such that when the process 1100 receives subsequent touch data and/or force data, the process 1100 may accurately determine an associated hand gesture corresponding to the touch data and/or the force data (via the model(s)). Here, as noted above, correlating the touch data, the force data, and/or the motion data may involve matching time stamps of the touch data, time stamps of the force data, and/or time stamps of the motion data.

At block 1110, the process 1100 may receive touch data. In some instances, the touch data received at block 1110 may correspond to touch data received during gameplay.

At block 1112, the process 1100 may receive force data. In some instances, the force data received at block 1112 may correspond to touch data received during gameplay.

At block 1114, the process 1100 may select a model(s). In some instances, to select the model(s), the touch data received at block 1110 may be compared with touch data or a touch profile corresponding to previously generated model(s). Additionally, or alternatively, selecting the model(s) may involve comparing the force data received at block 1112 with force data or the touch profile corresponding to previously generated model(s). The touch profile of the model(s) may include force values associated with force data representing the hand gesture of the model(s) and/or the location associated with the touch data representing the hand gesture of the model(s). By way of example, the touch data may indicate a touch input at a center of the controller, such as the middle finger and/or the index finger touching the controller (e.g., FIG. 10D). In some instances, the touch data may associate the touch input with certain fingers of the user and/or may indicate those fingers not touching the controller. Using the touch data and/or the force data, a corresponding model may be selected.

At block 1116, the process 1100 may input the touch data and/or the force data into the model(s). More particularly, because the model(s) are previously been trained to associate the touch data and/or the force data with motion data and corresponding hand gestures, once trained, the model(s) may receive the touch data and/or the force data and determine hand gestures. In other words, the touch data may indicate which fingers grasp the controller or which fingers do not grasp the controller, as well as a location on the controller corresponding to the touch, or lack thereof. Accordingly, after the model(s) are trained, the model(s) may accept touch data and/or the force data representing touch from a user received during gameplay.

At block 1118, the process 1100 may generate image data corresponding to the touch data and/or the force data. For instance, after inputting the touch data and/or the force data into the model(s), the process 1100 may use the touch data and/or the force to generate a hand gesture.

At block 1120, the process 1100 may present the image data on a display. With the process 1100, the representation of the hand gesture on the display may correspond to the hand gesture of the user interacting with the controller. Moreover, to reduce a latency between the receipt of the touch data and presentation of the image data, the process may perform blocks 1110-1120 in real-time and/or substantially contemporaneously with each other.

From block 1120, the process 1100 may loop to block 1110. Therein, the process 1100 may repeat between blocks 1110 and 1120 to continuously receive touch data and/or force data and generate animations corresponding to the touch input from the user. In doing so, as a user plays a game, the touch data and/or the force data received from the controller may change, depending on the levels, scenes, frame, and so forth in the game. Through continuously inputting the touch data and/or the force data into the model(s), the process 1100 may select a corresponding model(s) and continuously generate hand gestures for display.

As alluded to previously, in some instances, the process 1100 between block 1102 and block 1108 may occur during a first instance of time where the user is not playing in a gameplay mode and where the model(s) are trained. For instance, the training (or generation) of the model(s) may occur at a facility where the motion data (captured from the motion capture system(s) 102), the touch data, and/or the force data are captured and correlated with one another to associate the touch data and/or the force data with particular hand gestures. At a later instance in time, after the model(s) are trained, the process 1100 between block 1110 and block 1120 may occur while the user is in gameplay mode.

Shown in FIG. 12, at block 1202, the process 1200 may receive touch data corresponding to a touch input at a controller. For instance, the remote computing resource(s) 112 may receive the touch data 124 from the controller (e.g., the controller 110, 300, and/or 800). The touch data 124 may represent the location(s) on the controller corresponding to the touch input(s) of the user. As an example, the touch data 124 may indicate that all four fingers of the user are touching the controller, a location of the touch(es), or in some instances, which fingers are not touching the controller and/or which areas of the controller do not receive touch input.

At block 1204, the process 1200 may receive force data corresponding to the touch input at the controller. For instance, the remote computing resource(s) 112 may receive the force data 126 from the controller (e.g., the controller 110, 300, and/or 800). The force data 126 may represent an amount of force associated with the touch input at the controller or the relative strength associated with a grip of the user on the controller. In instances, were the user does not grip the controller (for instance, as shown in FIG. 10A), the remote computing resource(s) 112 may not receive the force data 126 from the controller.

At block 1206, the process 1200 may receive motion data corresponding to a movement of a user operating the controller. For instance, the remote computing resource(s) 112 may receive the motion data 122 from the motion capture system(s) 102. The motion data 122 may represent movements of a user and/or movements of the controller, using the markers 200, 202. As noted above, projector(s) of the motion capture system(s) 102 may project light onto markers 200, 202 disposed on the user and/or the controller. The markers 200, 202 may reflect this light, which is then captured by camera(s) of the motion capture system(s) 102.

At block 1208, the process 1200 may train a model(s) using the touch data, the force data, and/or the motion data. For instance, the remote computing resource(s) 112 may train (or generate) the model(s) 120 using the motion data 122, the touch data 124, and/or the force data 126. In some instances, training the model(s) 120 may involve associating the touch data 124, the force data 126, and/or the motion data 122 to determine characteristics of the touch data 124 and/or the force data 126 that correspond to movements of the user. In doing so, the remote computing resource(s) 112 may generate image data or an animation(s) corresponding to the touch data 124 received from the controller. That is, through associating the touch data 124, the force data 126, and/or the motion data 122, in later instances, upon receiving touch data 124 and/or the force data 126, the remote computing resource(s) 112 may correlate the touch data 124 and/or the force data 126 with a gesture of the user using the previous motion data 122. In some instances, associating the touch data 124, the force data 126, and/or the motion data 122 may involve matching time stamps of the touch data 124, time stamps of the force data 126, and time stamps of the motion data 122. In doing so, the remote computing resource(s) 112 may learn (e.g., using machine learning algorithms), how the touch data 124 and/or the force data 126 relates to hand gestures of the user.

From block 1208, the process 1200 may loop to block 1202 to receive additional touch data 124, additional force data 126, and/or additional motion data 122. For instance, the remote computing resource(s) 112 may receive additional touch data 124 (e.g., block 1202), additional force data 126 (e.g., block 1204), and/or additional motion data 122 (e.g., block 1206) to train the model(s) 120. Training the model(s) 120 may allow for a more accurate determination of the hand gesture performed by the user.

Shown in FIG. 13, at block 1302, the process 1300 may receive touch data. For instance, the remote computing resource(s) 112 may receive, from the controller (e.g., the controller 110, 300, and/or 800), the touch data 124. In some instances, an array of proximity sensors of the controller may generate the touch data 124. The touch data 124 may indicate the placement of the user's fingers or hand on the controller 110.

At block 1304, the process 1300 may receive force data. For instance, the remote computing resource(s) 112 may receive, from the controller (e.g., the controller 110, 300, and/or 800), the force data 126. In some instances, an FSR (e.g., the FSR 900) of the controller may generate the force data 126, which may indicate an amount of force associated with touches of the user on the controller.

At block 1306, the process 1300 may input the touch data and/or the force data into the model(s). For instance, the processor(s) 116 of the remote computing resource(s) 112 may input the touch data 124 and/or the force data 126 into the model(s) 120. More particularly, because the model(s) 120 are previously trained to associate the touch data 124 and/or the force data 126 with the motion data 122 and hand gestures, once trained, the model(s) 120 may receive the touch data 124 and/or the force data 126 to determine hand gestures. In some instances, the remote computing resource(s) 112 may selectively input the touch data 124 and/or the force data 126 into model(s) 120 that closely match or are associated with the touch data 124 and/or the force data 126. For instance, if the touch data 124 indicates that the user grips the controller 110 with four fingers, the processor(s) 116 may select a model 120 that corresponds to a four-finger grip.

At block 1308, the process 1300 may generate image data corresponding to the touch data and/or the force data. For instance, the processor(s) 116 of the remote computing resource(s) 112, using the model(s) 120, may determine a hand gesture corresponding to the touch data 124 and/or the force data 126. The remote computing resource(s) 112 may generate image data, such as the animation 128, corresponding to the hand gesture. For instance, the model(s) 120 may generate the animation 128 of the hand utilizing the touch data 124 and/or the force data 126 (e.g., crushing a rock or dropping an object).

At block 1310, the process 1300 may present the image data on a display. For instance, the remote computing resource(s) 112, may transmit the image data to the VR headset 108 (or another computing device), whereby the VR headset 108 may display the image data. The VR headset 108 may display the hand gesture on the display according to the touch data 124 and/or the force data 126 received at the controller(s) 110. As such, the representation of the hand gesture on the display of the VR headset 108 may correlate with the hand gesture in which the user interacts with the controller(s) 110. Moreover, to reduce a latency between the receipt of the touch data 124 and presentation of the image data on the VR headset 108, the process 1300 may perform blocks 1302-1310 in real-time and/or substantially contemporaneously with each other. Additional, the pre-generation of the model(s) 120 may allow for faster computing when receiving the touch data 124 and/or the force data 126 to generate an associated hand gesture.

From block 1310, the process 1300 may loop to block 1302, where the process 1300 may repeat between blocks 1302 and 1310 to continuously generate image data. As a result, the touch data 124 and/or the force data 126 corresponding to how the user holds and grips the controller 110 may update, and through inputting the touch data 124 and/or the force data 126 into the model(s) 120, the process 1300 may continuously generate hand gestures for display on the VR headset 108.

CONCLUSION

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A system comprising:
one or more processors; and
one or more non-transitory computer-readable media storing computer-executable instructions that, when executed by the one or more processors, cause the one or more processors to perform acts comprising:
receiving, via one or more cameras, first images depicting light reflected or emitted by markers coupled to a hand operating a controller;
analyzing the first images to generate first motion data indicating first tracked positions of the markers, the first tracked positions corresponding to a first movement of the hand operating the controller;
receiving, via the controller, first touch data corresponding to a first touch of the hand operating the controller;
receiving, via the controller, first force data corresponding to the first touch of the hand operating the controller;
associating the first motion data with the first touch data and the first force data;
generating, based at least in part on the first motion data, the first touch data, and the first force data, a model corresponding to a gesture of the hand;
receiving, via the one or more cameras, second images depicting light reflected or emitted by the markers coupled to the hand operating the controller;
analyzing the second images to generate second motion data indicating second tracked positions of the markers, the second tracked positions corresponding to a second movement of the hand operating the controller;
receiving, via the controller, second touch data corresponding to a second touch of the hand operating the controller;
receiving, via the more controller, second force data corresponding to the second touch of the hand operating the controller;
associating the second motion data with the second touch data and the second force data;
training, based at least in part on the second motion data, the second touch data, and the second force data, the model corresponding to the gesture of the hand;
receiving, via the controller, third touch data corresponding to a third touch of the hand operating the controller;
receiving, via the controller, third force data corresponding to the third touch of the hand operating the controller; and
generating, based at least in part on the model corresponding to the gesture and at least one of the third touch data or the third force data, image data corresponding to a representation of the hand.

2. The system as recited in claim 1, wherein the one or more non-transitory computer-readable media store computer-executable instructions that, when executed by the one or more processors, cause the one or more processors to further perform an act comprising transmitting, to a virtual reality display, the image data corresponding to the representation of the hand.

3. The system as recited in claim 1, wherein the one or more cameras are configured to capture information for detecting depths of the markers.

4. The system as recited in claim 1, wherein:
the associating the first motion data with the first touch data and the first force data includes matching a first time stamp of the first motion data with a first time stamp of the first touch data and a first time stamp of the first force data; and
the associating the second motion data with the second touch data and second force data includes matching a second time stamp of the second motion data with a second time stamp of the second touch data and a second time stamp of the second force data.

5. A system comprising:
one or more processors; and
one or more non-transitory computer-readable media storing computer-executable instructions that, when executed by the one or more processors, cause the one or more processors to perform acts comprising:
receiving images captured by one or more cameras, the images depicting light reflected or emitted by markers coupled to a hand operating a controller;
analyzing the images to generate motion data indicating tracked positions of the markers, the tracked positions corresponding to a movement of the hand operating the controller;
receiving touch data corresponding to touch input of the hand operating the controller;
associating the motion data and the touch data; and
training, based at least in part on the motion data and the touch data, a model to generate a trained model that is configured to determine a gesture of the hand based at least in part on subsequent touch data.

6. The system as recited in claim 5, wherein the motion data comprises first motion data and the touch data comprises first touch data, the movement of the hand comprises a first movement, and the touch input of the hand comprises a first touch input, and wherein the one or more non-transitory computer-readable media store computer-executable instructions that, when executed by the one or more processors, cause the one or more processors to further perform acts comprising:
receiving second images captured by the one or more cameras, the second images depicting light reflected or emitted by the markers coupled to the hand operating the controller;
analyzing the second images to generate second motion data indicating second tracked positions of the markers, the second tracked positions corresponding to a second movement of the hand operating the controller;
receiving second touch data corresponding to second touch input of the hand operating the controller;
associating the second motion data and the second touch data; and
generating, based at least in part on the second motion data and the second touch data, an updated trained model that is configured to determine the gesture of the hand.

7. The system as recited in claim 5, wherein the one or more non-transitory computer-readable media store computer-executable instructions that, when executed by the one or more processors, cause the one or more processors to further perform acts comprising:
generating, using the trained model, image data corresponding to a representation of the hand; and transmitting the image data corresponding to the representation of the hand.

8. The system as recited in claim 7, wherein transmitting the image data causes a remote device to display the representation of the hand.

9. The system as recited in claim 5, wherein the one or more non-transitory computer-readable media store computer-executable instructions that, when executed by the one or more processors, cause the one or more processors to further perform an act comprising receiving force data corresponding to an amount of force associated with the touch input, and
wherein the training of the model is further based at least in part on the force data.

10. The system as recited in claim 5, wherein the touch data indicates one or more locations on the controller receiving the touch input.

11. The system as recited in claim 5, wherein associating the motion data and the touch data comprises associating a time stamp of the motion data with a time stamp of the touch data.

12. The system as recited in claim 5, wherein:
receiving the touch data comprises receiving the touch data from the controller communicatively coupled to the system.

13. A method comprising:
receiving, by one or more processors, images captured by one or more cameras, the images depicting light reflected or emitted by markers coupled to a hand operating a controller;
analyzing, by the one or more processors, the images to generate motion data indicating tracked positions of the markers, the tracked positions corresponding to a movement of the hand operating the controller;
receiving, by the one or more processors, touch data corresponding to touch input of the hand operating the controller;
associating, by the one or more processors, the motion data and the touch data; and
training, by the one or more processors, and based at least in part on the motion data and the touch data, a model to generate a trained model that is configured to determine a gesture of the hand based at least in part on subsequent touch data.

14. The method as recited in claim 13, wherein the motion data comprises first motion data and the touch data comprises first touch data, the movement of the hand comprises a first movement, and the touch input of the hand comprises a first touch input, the method further comprising:
receiving, by the one or more processors, second images captured by the one or more cameras, the second images depicting light reflected or emitted by the markers coupled to the hand operating the controller;
analyzing, by the one or more processors, the second images to generate second motion data indicating second tracked positions of the markers, the second tracked positions corresponding to a second movement of the hand operating the controller;
receiving, by the one or more processors, second touch data corresponding to second touch input of the hand operating the controller;
associating, by the one or more processors, the second motion data and the second touch data; and
generating, by the one or more processors, and based at least in part on the second motion data and the second touch data, an updated trained model that is configured to determine the gesture of the hand.

15. The method as recited in claim 13, further comprising:
generating, by the one or more processors, and using the trained model, image data corresponding to a representation of the hand; and
transmitting the image data corresponding to the representation of the hand.

16. The method as recited in claim 15, wherein transmitting the image data causes a remote device to display the representation of the hand.

17. The method as recited in claim 13, further comprising receiving, by the one or more processors, force data corresponding to an amount of force associated with the touch input, and
wherein the training of the model is further based at least in part on the force data.

18. The method as recited in claim 13, wherein the touch data indicates one or more locations on the controller receiving the touch input.

19. The method as recited in claim 13, wherein associating the motion data and the touch data comprises associating a time stamp of the motion data with a time stamp of the touch data.

20. The method as recited in claim 13, wherein receiving the touch data comprises receiving the touch data from the controller.

* * * * *